(12) United States Patent
Kivimaki

(10) Patent No.: US 12,325,207 B2
(45) Date of Patent: Jun. 10, 2025

(54) LINERLESS LABEL

(71) Applicant: UPM Raflatac Oy, Tampere (FI)

(72) Inventor: Juha Kivimaki, Helsinki (FI)

(73) Assignee: UPM RAFLATAC OY, Tampere (FI)

( * ) Notice: Subject to any disclaimer, the term of this patent is extended or adjusted under 35 U.S.C. 154(b) by 180 days.

(21) Appl. No.: 18/023,780

(22) PCT Filed: Sep. 28, 2021

(86) PCT No.: PCT/EP2021/076618
§ 371 (c)(1),
(2) Date: Feb. 28, 2023

(87) PCT Pub. No.: WO2022/069458
PCT Pub. Date: Apr. 7, 2022

(65) Prior Publication Data
US 2023/0286243 A1 Sep. 14, 2023

(30) Foreign Application Priority Data

Sep. 29, 2020 (EP) ..................................... 20198915
Dec. 30, 2020 (EP) ..................................... 20217744

(51) Int. Cl.
*B31D 1/02* (2006.01)
*G09F 3/02* (2006.01)
*G09F 3/10* (2006.01)

(52) U.S. Cl.
CPC ............. *B31D 1/021* (2013.01); *B31D 1/027* (2013.01); *G09F 3/10* (2013.01); *G09F 2003/0211* (2013.01); *G09F 2003/0258* (2013.01)

(58) Field of Classification Search
CPC ........ B31D 1/021; B31D 1/027; B31D 1/026; G09F 3/10; G09F 2003/0211;
(Continued)

(56) References Cited

U.S. PATENT DOCUMENTS

| | | |
|---|---|---|
| 5,840,657 A | 11/1998 | Mehta et al. |
| 2009/0169282 A1 | 7/2009 | Keeton |
| 2015/0159054 A1 | 6/2015 | Wild et al. |

FOREIGN PATENT DOCUMENTS

| | | |
|---|---|---|
| CN | 111986555 A | 11/2020 |
| DE | 2906284 A1 | 8/1980 |

(Continued)

OTHER PUBLICATIONS

European Search Report for the corresponding European Application No. 20198915; Date of report: Mar. 4, 2021; 7 pages.
(Continued)

*Primary Examiner* — Patricia L. Nordmeyer
(74) *Attorney, Agent, or Firm* — CANTOR COLBURN LLP

(57) ABSTRACT

This invention relates to a method for manufacturing a direct thermal linerless label web (100), the direct thermal linerless label web (100) comprising a face (110) having a multilayer structure comprising at least three layers, the face comprising a base layer (113), a direct thermal printable coating (115), and an intermediate layer (114) disposed between the base layer and the direct thermal printable coating, wherein the intermediate layer has a grammage in a range between 0.9 g/m$^2$ and 7 g/m$^2$, total amount of mineral pigments in the intermediate layer is equal to or less than 4 g/m$^2$, and a mineral pigment content of the intermediate layer is less than 85 wt. %, preferably equal to or less than 75 wt. %, calculated from total dry weight of the intermediate layer, wherein the method comprises: supplying the face (110), applying a water-based acrylic adhesive coating (121), and the thermally drying the adhesive coating (121) into a pressure sensitive adhesive coating (120), wherein the water-based acrylic adhesive coating (121) is applied onto the face, or the water-based acrylic adhesive coating (121) is applied on to a carrier material, and the method further
(Continued)

comprises: transferring the pressure sensitive adhesive coating from the carrier material on to the face. This invention further relates to a direct thermal linerless label web (100), and a use of a direct thermal linerless label (100) in on-demand printing.

24 Claims, 10 Drawing Sheets

(58) Field of Classification Search
CPC ........ G09F 2003/0258; G09F 2003/026; C09J 2203/334; C09J 2301/408; C09J 2301/41; C09J 2400/283; C09J 2433/00; C09J 7/385; C09J 7/29
See application file for complete search history.

(56) References Cited

FOREIGN PATENT DOCUMENTS

| | | | |
|---|---|---|---|
| EP | 1407994 | A1 | 4/2004 |
| EP | 2551838 | A1 | 1/2013 |
| JP | H09127871 | A | 5/1997 |
| JP | H1058829 | A | 3/1998 |
| JP | 2012218311 | A | 11/2012 |
| JP | 6649618 | B2 | 2/2020 |
| WO | 9118739 | A1 | 12/1991 |
| WO | 9315159 | A1 | 8/1993 |
| WO | 9917906 | A1 | 4/1999 |
| WO | 2016012652 | A1 | 1/2016 |
| WO | WO-2020175649 | A1 * | 9/2020 |
| WO | 2021123490 | A1 | 6/2021 |

OTHER PUBLICATIONS

European Search Report for the corresponding European Application No. 20217744; Date of report: Jun. 15, 2021; 10 pages.
International Preliminary Report on Patentability for the corresponding International Application No. PCT/EP2021/076618; International Date of Filing: Sep. 28, 2021; Date of Mailing: Aug. 22, 2022; 21 pages.

* cited by examiner

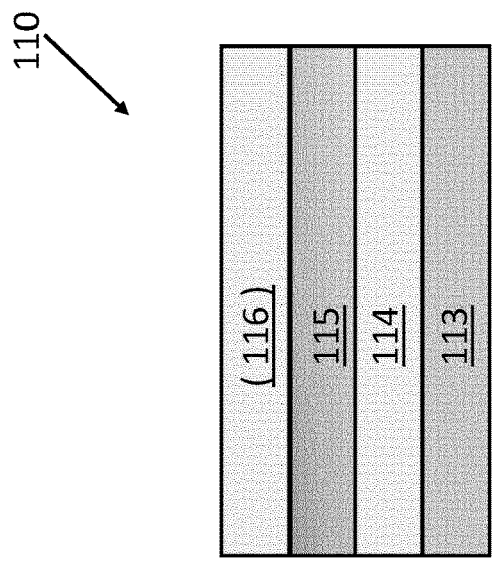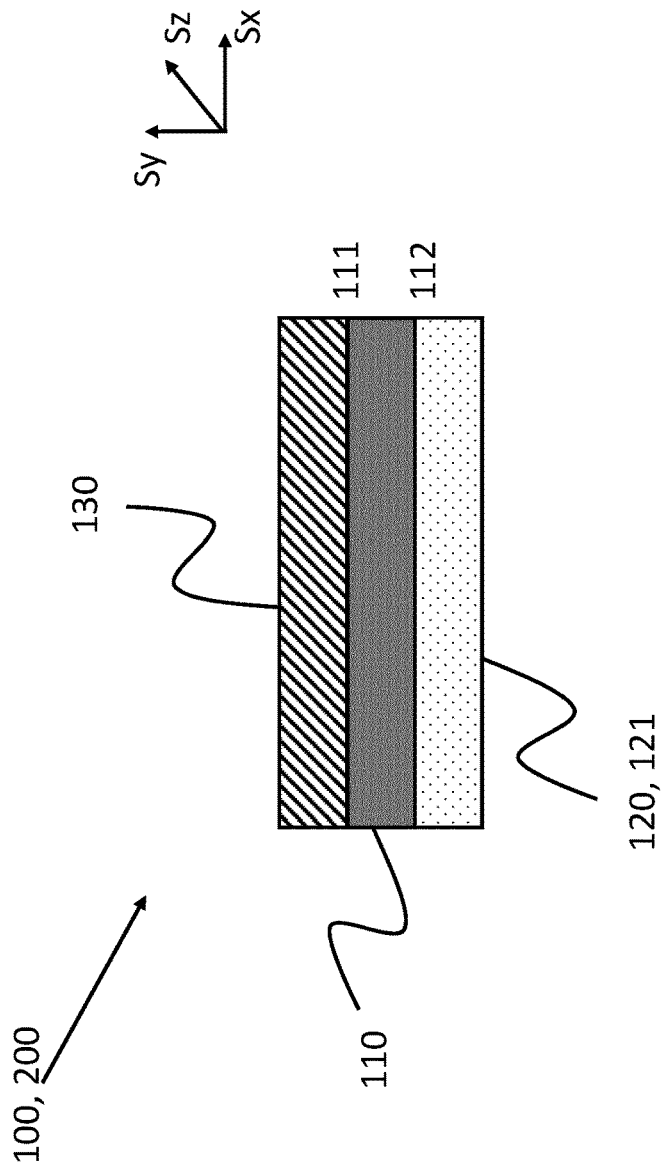
Fig. 1b
Fig. 1a

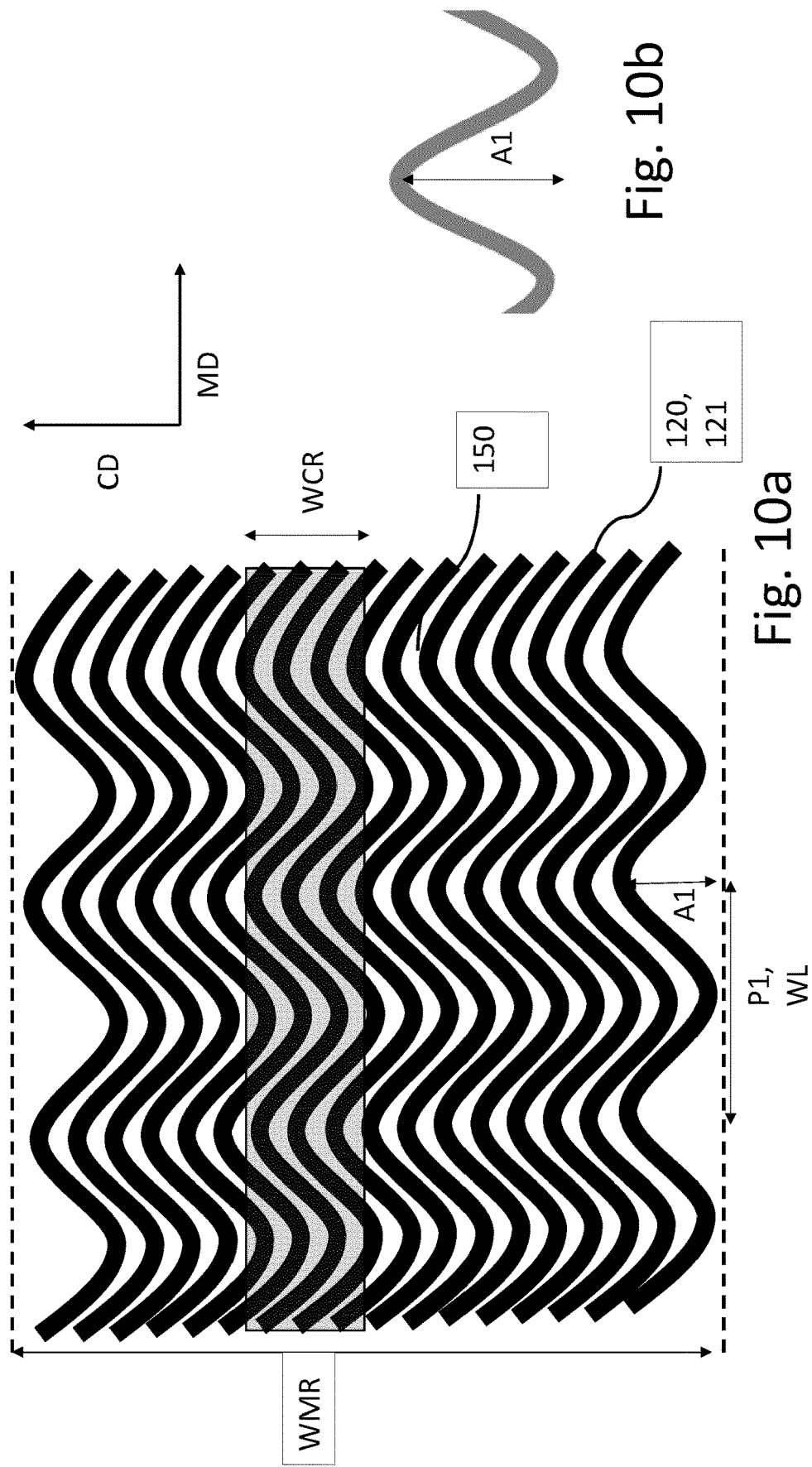

LINERLESS LABEL

CROSS-REFERENCE TO RELATED APPLICATIONS

This application is a National Stage application of PCT/EP2021/076618, filed Sep. 28, 2021, which claims benefit of and priority to European Application No. 20198915.9 filed on Sep. 29, 2020, and European Application No. 20217744.0 filed on Dec. 30, 2020, all of which are incorporated by reference herein in their entirety.

TECHNICAL FIELD

This specification relates to a method for manufacturing a direct thermal linerless label web. This specification further relates to a direct thermal linerless label web. This specification further relates to a use of a direct thermal linerless label web in on-demand printing.

BACKGROUND

Linerless labels having direct thermal face materials may be used for several purposes, such as for on-demand printing. However, conventional linerless labels are known to have caused problems in prolonged use especially in simple and low-cost on-demand printers. These problems may arise from the pressure sensitive adhesive being exposed without protective release liner and thus causing sticky adhesive contamination onto the printer internal mechanisms causing printer jamming and need for additional service.

Further, traditionally, some pressure sensitive adhesives have been difficult to use in linerless labels which comprise direct thermal face materials. Thus, there is still a need for an improved yet simple direct thermal linerless label product, and an improved method for manufacturing direct thermal label products providing consistent and trouble free performance.

SUMMARY

It is an aim of this specification to provide a method for manufacturing a direct thermal linerless label web comprising pressure sensitive adhesive. Further, it is an aim of the specification to provide a direct thermal linerless label web comprising pressure sensitive adhesive.

Aspects of the invention are characterized by what is stated in the independent claims. Some preferred embodiments are disclosed in the dependent claims. These and other embodiments are disclosed in the description and figures.

A method for manufacturing a direct thermal linerless label web comprising a face comprising
  a base layer,
  a direct thermal printable coating, and
  an intermediate layer disposed between the base layer and the direct thermal printable coating,
  wherein
  the intermediate layer has a grammage in a range between 0.9 g/m² and 7 g/m²,
  a total amount of mineral pigments in the intermediate layer is equal to or less than 4 g/m², and
  the mineral pigment content of the intermediate layer is less than 85 wt. %, preferably less than 75 wt. %, calculated from total dry weight of the intermediate layer, may comprise the following steps:
  supplying the face,
  applying a water-based acrylic adhesive coating, and
  thermally drying the adhesive coating into a pressure sensitive adhesive coating,
  wherein
  i) the adhesive coating is applied on to the face, or
  ii) the adhesive coating is applied on to a carrier material, and the method further comprises:
  transferring the pressure sensitive adhesive coating from the carrier material on to the face.

A speed of the adhesive layer during the drying process may be, for example, in a range between 100 m/min and 600 m/min.

Thanks to the novel solution, dusting of a direct thermal linerless label web in on-demand printers may be substantially decreased.

According to an embodiment, a method for manufacturing a direct thermal linerless label web comprising an adhesive coating comprising emulsified silicone additive is provided.

According to an embodiment, a method for manufacturing a direct thermal linerless label web comprising a patterned adhesive coating is provided.

The direct thermal linerless label web comprises a face having a first side and a second side. The first side of the face can be the top side of the face, and the second side of the face can be the bottom side of the face. Further, a first side of the direct thermal linerless label web can be the top side of the linerless label web, and a second side of the direct thermal linerless label web can be the bottom side of the linerless label web.

The face can comprise
  a base layer, which is an uncoated base paper or a filmic material,
  a direct thermal printable coating, and
  an intermediate layer between the base layer and the direct thermal printable coating.

Advantageously, for cost and environmental reasons, the base layer is an uncoated base paper having a grammage in a range between 38 g/m² and 82 g/m². A mineral pigment content of the uncoated base paper is preferably equal to or less than 18 wt. %, more preferably equal to or less than 16 wt. % in order to decrease dusting tendency of the product.

The uncoated base paper may have a fiber content of equal to or more than 50 wt. %, preferably at least 60 wt. %, in order to improve strength of the linerless label web as well as decrease dusting tendency of the product.

The direct thermal printable coating of the face may have a grammage in a range between 1 g/m² and 5 g/m².

The intermediate layer can have
  grammage in a range between 0.9 g/m² and 7 g/m², preferably in a range between 1 g/m² and 5 g/m²,
  mineral pigment content of less than 85 wt. % preferably equal to or less than 75 wt. %, calculated from total dry weight of the intermediate layer, and
  total amount of mineral pigments in the intermediate layer of equal to or less than 4 g/m², preferably equal to or less than 3 g/m².

The face may further comprise a top coating on the top of the direct thermal printable coating. The top coating may protect the direct thermal printable coating layer. The top coating may have a grammage in a range between 0.5 g/m² and 3 g/m².

The top coating may comprise at least one of: starch, polyvinyl alcohol (PVA), latex, and wax. Preferably, the top coating comprises polyvinyl alcohol (PVA) and/or wax. These polymers may be used to protect the direct thermal printable coating. Furthermore, wax may improve friction properties of the linerless label web. The top coating may further help to decrease dusting of the linerless label web.

The direct thermal linerless label web can comprise, in addition to the face, an adhesive coating. The adhesive coating is preferably a water-based acrylic adhesive. In an embodiment, the adhesive comprises a silicone additive.

Thus, in an embodiment, the direct thermal linerless label web may consist of
- the face comprising at least
  - base layer, preferably being a paper,
  - direct thermal printable coating, and
  - intermediate layer disposed between the base layer and the direct thermal printable coating,
- optionally, a release coating on the face, and
- adhesive coating.

The linerless label web can be a paper-based direct thermal linerless label web for environmental reasons. However, dusting, caused at least partly by mineral particles in the paper and the intermediate layer, can disturb labelling process and decrease quality of direct thermal printing and eventually might cause a damage to a print head. Thus, by minimizing dusting of paper-based direct thermal linerless labels, it may be possible to achieve a long, trouble-free printing for the paper-based direct thermal linerless labels. Thanks to an advantageous embodiment, it may be possible to decrease dusting of paper-based direct thermal linerless labels in direct thermal printers.

Depending on the printer model in question, the dust and other contaminating residues from the label material can have several different adverse effects in the printer mechanisms. Some of these effects are also interrelated and may together strengthen the overall negative outcome. For example, the dust released from the thermal linerless label can alone, as such, wear and reduce the lifetime of the thermal print head. But if the dust becomes further accumulated on the print head or surroundings due to some adhesive residues, it may also reduce the thermal contact of the print head to the label material and deteriorate the print quality. This may cause hot spots in the printer head and/or be necessary to compensate by using higher print head energies which again shortens the lifetime of the printer. The sticky adhesive residues are often generated especially upon cutting the label material against a manual or motored guillotine mechanism to separate the printed individual label. These residues then may weaken the action of the cutting mechanism itself or become slowly conveyed and accumulated onto the other internals of the printer. Therefore, the cutting properties of the adhesive layer as such play an important role in how much adhesive residue is created. The cutting phase is also a major source of dust releasing dust from the internal layers of the label material. Therefore, this invention aims to optimize especially the cutting phase via optimizing the properties of the thermal face substrate as well as the adhesive layer. This minimizes the negative effects related to each of these layers/components alone but also minimizes the interrelated further effects explained above.

The adhesive coating can comprise water-based acrylic adhesive coating. The adhesive coating may further comprise an emulsified silicone additive. An amount of the emulsified silicone additive, if used, may be in a range between 1 wt. % and 6 wt. %, preferably in a range between 2 wt. % and 4 wt. %, calculated from the total dry weight of the adhesive coating. Thus, it is possible to provide an improved usability of the linerless label for printers with a cost effective solution. Furthermore, this kind of adhesive coating can still have good adhesive properties.

The adhesive coating may also comprise one or more than one wetting agent. Total amount of wetting agent(s), if used, may be in a range between 0.3 wt. % and 5 wt. %, calculated from the total dry weight of the adhesive coating.

The adhesive coating layer may have a coat weight in a range between 10 $g/m^2$ and 30 $g/m^2$, preferably in a range between 10 $g/m^2$ and 25 $g/m^2$, calculated as total dry weight of the adhesive coating layer.

Total coverage of the adhesive coating may be up to 100% calculated from the total area of the second side. In an embodiment, total coverage of the adhesive coating is in a range between 10% and 90%, calculated from the total area of the second side. The reduced coverage may help to reduce dust and adhesive accumulation to a guillotine blade of an on-demand printer The intermediate layer has a grammage in a range between 0.9 $g/m^2$ and 7 $g/m^2$. In an advantageous embodiment, the intermediate layer has a grammage in a range between 0.9 $g/m^2$ and 5 $g/m^2$, more preferably in a range between 1 $g/m^2$ and 4 $g/m^2$, and most preferably in a range between 1 $g/m^2$ and 3 $g/m^2$. Thanks to the intermediate layer, a quality of the direct thermal coating may be improved. Further, amount of expensive direct thermal coating needed to obtain good printable properties may be decreased.

A total amount of mineral pigments in the intermediate layer can be equal to or less than 4 $g/m^2$. In an advantageous embodiment, the total amount of mineral pigments in the intermediate layer is equal to or less than 3 $g/m^2$, more preferably equal to or less than 2.5 $g/m^2$, and most preferably equal to or less than 2 $g/m^2$. Mineral fillers may increase dusting of the face, which may cause blocking and other problems to on-demand printers. Thus, preferably, total amount of mineral pigments in the intermediate layer is substantially low.

Furthermore, the mineral pigment content of the intermediate layer can be less than 85 wt. %. In an embodiment, the mineral pigment content of the intermediate layer is equal to or less than 80 wt. %, preferably less than 70 wt. %, more preferably less than 60 wt. %, and most preferably less than 50 wt. %, calculated from total dry weight of the intermediate layer. Mineral fillers may increase dusting of the face, which may cause blocking and other problems to on-demand printers. Higher mineral pigment content of the intermediate layer can increase dusting tendency of the product. Thus, preferably, content of mineral pigments in the intermediate layer is substantially low.

A binder content of the intermediate layer may be equal to or more than 15 wt. %, preferably equal to or more than 25 wt. %, more preferably equal to or more than 35 wt. %, and most preferably equal to or more than 45 wt. % calculated from total dry weight of the intermediate layer. The increased binder content of the intermediate layer can help to reduce dusting, which might cause blocking and other problems to on-demand printers.

Total mineral content of the direct thermal linerless label web may be in a range between 0 and 20 wt. %, preferably 0 and 10 wt. %, calculated from total dry weight of the direct thermal linerless label web. Thus, dusting related problems may be avoided, or at least diminished.

In an embodiment, a method for manufacturing a direct thermal linerless label web for on-demand printing can comprise the following steps:
- supplying the face comprising the direct thermal printable coating, applying adhesive coating on to a substrate, the adhesive coating comprising
a) water-based acrylic adhesive,
b) optionally, emulsified silicone additive, the amount of the emulsified silicone additive being in a range between 1 wt. % and 6 wt. %, and
c) optionally, at least one wetting agent, and
thermally drying the adhesive coating on a substrate into a pressure sensitive adhesive coating,
wherein
1) the adhesive coating is applied on to the face, or
2) the adhesive coating is applied on to a carrier material, and the method further comprises:
transferring the pressure sensitive adhesive coating from the carrier material on to the face.

In this embodiment, the substrate may be the first side of the face or the second side of the face. Alternatively, the substrate may be the carrier material and the pressure sensitive adhesive coating may be transferred from the carrier material onto the first or second side of the face. After rolling the linerless label web into a roll, the PSA coating will become anchored to the second side (i.e., the bottom side) of the face material, no matter whether the adhesive coating was applied or transferred on the first side or the second side of the face.

In an embodiment, said adhesive coating is first applied on to a substrate, which is the face, and then thermally dried into the pressure sensitive adhesive coating on the face.

In another embodiment, said adhesive coating is applied on to a substrate, which is a carrier material, and then thermally dried into the pressure sensitive adhesive coating on the carrier material, after which the pressure sensitive adhesive is transferred from the carrier material onto the face.

Thus, said adhesive coating may be applied onto the second side of the face, or the pressure sensitive adhesive coating may be transferred from the carrier material onto the second side of the face.

Alternatively, the linerless label web may comprise the release coating on the first side of the face, and said adhesive coating may be applied onto the release coating, or the pressure sensitive adhesive coating may be transferred from the carrier material onto the release coating. After rolling the direct thermal face into a roll, the pressure sensitive adhesive will become anchored to the second, i.e. bottom side of the face material. This embodiment may be particularly efficient manufacturing method, and the obtained product may have good properties for on-demand printing.

The water-based acrylic adhesive may be a tackified acrylic adhesive. The tackified acrylic adhesive may be used to provide aggressive adhesion to a surface.

The adhesive is most preferably an acrylic water-based adhesive.

The adhesive coating may comprise at least one surface-active agent. The surface-active agents, in general, are compounds that lower the surface tension (or interfacial tension) between two liquids, between a gas and a liquid, or between a liquid and a solid. At least one surface-active agent may be an emulsifier in order to obtain the emulsified silicone additive.

Thus, in an embodiment, the adhesive coating comprises emulsified silicone additive. The emulsifier may keep the silicone additive as a stable water dispersion. The emulsified silicone additive may comprise a silicone component, for example, a silicone oil (polydimethylsiloxane),
at least one emulsifier, and
water.

Thus, the silicone additive, if used, may be added in a form of an aqueous emulsion which contains an emulsifier. In an embodiment, the emulsifier is nonionic or anionic, such as slightly anionic.

The amount of the silicone additive, of used, may be equal to or more than 1 wt. %, more preferably equal to or more than 1.5 wt., and most preferably equal to or more than 2 wt. %, calculated from the total dry weight of the adhesive coating. Furthermore, the amount of the silicone may be equal to or less than 6 wt. %, more preferably equal to or less than 5 wt. %, and most preferably equal to or less than 4 wt. % calculated from the total dry weight of the adhesive coating. Water-based acrylic adhesives and silicone additive have not traditionally been easily mixed with each other. The silicone additive may be mixed with the water-based acrylic adhesive in a form of emulsion in order to form the adhesive coating comprising the silicone additive and the adhesive. Thus, the silicone additive may be supplied in the form of an aqueous emulsion.

In an embodiment, the adhesive coating comprises two surface-active agents, which are an emulsifier and a wetting agent. The wetting agent may be added into the adhesive coating to improve the coating process of the adhesive coating. The wetting agent may increase spreading and penetrating properties by lowering a surface tension.

In an embodiment, the adhesive coating can comprise wetting agents so that the total content of the wetting agent(s) may be in a range between 0 and 5 wt. %, more preferably at least 0.3 wt. %, and most preferably in a range between 0.4 wt. % and 3 wt. %, calculated from the total dry weight of the adhesive coating.

The person skilled in the art knows the wetting agents. In an embodiment, the wetting agent may comprise, for example, at least one of the following
Surfynol 3120 from Evonik,
Hydropalat 3120 from Basf, and
Lumiten ISC from Basf.

However, these are only some examples of suitable wetting agents.

An amount of the adhesive in the adhesive coating may be in a range between 90 wt. % and 100 wt. % calculated from the total dry weight of the pressure sensitive adhesive coating.

The adhesive coating layer may comprise adhesive areas and adhesion-free areas. The adhesive coating layer may comprise, for example, at least one of:
straight continuous stripe(s),
positionally alternating continuous stripe(s), and
patched pattern gumming.

The total coverage of the pressure sensitive adhesive coating, calculated from the total surface area of the second side, may be equal to or less than 100%, preferably equal to or less than 90%, and more preferably equal to or less than 80%, calculated from the total surface area of the second side. Furthermore, the total coverage of the pressure sensitive adhesive coating, calculated from the total surface area of the second side, may be equal to or more than 10%, more preferably equal to or more than 20%, and most preferably equal to or more than 30%, calculated from the total surface area of the second side.

The pressure sensitive adhesive coating may be arranged on the second side of the face, for example, as continuous adhesive stripes in a longitudinal direction of the web. The continuous adhesive stripes may be straight continuous adhesive stripes. Alternatively or in addition to the straight continuous adhesive stripes, the continuous adhesive stripes may be positionally alternating continuous adhesive stripes.

In an embodiment, positionally alternating continuous adhesive stripes are arranged on the second side of the linerless label web with predetermined number of the stripes in cross-direction of the web, predetermined width of the stripes in the cross-direction of the web, predetermined positional frequency of the stripes in the lengthwise direction of the web, and predetermined positional amplitude of the stripes in the cross-direction of the web. In this embodiment, said predetermined properties of the positionally alternating continuous adhesive stripes can be selected so that number of the stripes in each single customer roll is one or more, width of each stripe is smaller than a width of each single customer roll, and positional frequency is selected so that one oscillation cycle covers 0.1-10 peripherical lengths in a machine roll. Further, one oscillation cycle may cover 1-100 peripherical lengths in a customer roll defined as peripheries of full rolls.

Therefore, the method may further comprise the following step:
providing alternating adhesion areas and adhesion-free areas before the adhesive coating is dried into the pressure sensitive adhesive coating.

The adhesion-free areas may reduce an accumulation of the adhesive coating to a linerless label printer. Said accumulation of the adhesive might result more dusting related problems as dust can be adhered together with the adhesive to the printer and, hence, result shortened printer service cycle.

In an embodiment, the adhesive coating is applied locally onto the face or onto the carrier to provide the face with alternating adhesive areas and adhesion-free areas.

In an embodiment, the adhesive coating may be applied on the face, most preferably on the second side of the face, and the method may further comprise:
providing moisture to the adhesion-free areas of the face prior to drying of the adhesive coating.

In this embodiment, the moisture may be provided e.g. by spraying water on the adhesion-free areas of the second side of the face.

Alternatively, or in addition, the method may comprise the following step(s) to provide the adhesion-free areas:
applying adhesive coating on the substrate (i.e., the face or the carrier material), and
removing at least 10% of the adhesive coating from the substrate (i.e., the face or the carrier material) prior to drying to provide alternating adhesion areas and adhesion-free areas.

In this embodiment, the removing of the adhesive coating may be implemented, e.g., by a wiping blade, wherein the blade is preferably arranged at a wiping angle of 75-85 degrees with respect to the surface of the substrate. A dwell time between applying the adhesive coating and removing the adhesive coating may be from 0.05 to 3 seconds.

As discussed, the adhesive coating may be dried on the face or on the carrier material into the pressure sensitive adhesive coating. If the adhesive coating is dried on the carrier material, the adhesive is dried into the pressure sensitive adhesive before the adhesive is transferred on to the face. The carrier material, if used, may be a reusable batch of a web material, or an endless belt.

The adhesive coating may be dried at a temperature in a range between 60° C. and 100° C. If the adhesive coating is dried on the face, temperature of the linerless label web when exiting thermal drying may be arranged to be from 5 to 15 degrees C. below an activation temperature of the direct thermal printable coating.

The pressure sensitive adhesive coating may have a coat weight equal to or more than 5 g/m$^2$, more preferably equal to or more than 10 g/m$^2$, and most preferably equal to or more than 15 g/m$^2$, calculated as total dry weight of the pressure sensitive adhesive coating on the second side. Furthermore, the pressure sensitive adhesive coating may have a coat weight equal to or less than 25 g/m$^2$ more preferably equal to or less than 21 g/m$^2$, and most preferably equal to or less than 16 g/m$^2$, calculated as total dry weight of the pressure sensitive adhesive coating on the second side.

The direct thermal linerless label web may be used in on-demand printing.

Thanks to the novel solution, many advantages may be obtained. For example, it is possible to obtain a linerless label web for on-demand linerless label printer in a cost-effective manner, which linerless label may have improved properties for on-demand printers as well as for the labelling purpose.

Furthermore, thanks to the solution comprising direct thermal linerless label web comprising acrylic PSA and the intermediate layer, dusting of the direct thermal linerless label web in on demand printers may be substantially decreased.

Further, the adhesive coating, particularly if comprising the PSA and silicone additive, may together with the intermediate layer improve the functioning of the motorized or manual guillotine in linerless printers. Adhesive comprising water-based acrylic PSA comprising silicone additive, may be easier to cut through mechanically in such devices with less adhesive residue left on the cutting blade or edge. Further, thanks to an embodiment having paper based base layer, it might be easier to achieve good, cost efficient, and environmentally friendly substrate for the direct thermal printable layer while decreasing dusting tendency of the paper based direct thermal linerless label web.

Furthermore, the method may allow drying of the adhesive on a face or on a carrier material without causing unwanted and premature color changes to the thermally sensitive coating of the direct thermal linerless label web.

BRIEF DESCRIPTION OF THE DRAWINGS

FIG. 1a illustrates, by way of an example, an $S_x$, $S_y$-cross-section of a linerless label (web), FIG. 1b illustrates, by way of an example, an $S_x$, $S_y$-cross-section of a face, FIGS. 10a-b illustrates, by way of examples, positionally alternating adhesive stripes on a surface of a linerless label, and FIGS. 11a-b show photos from experimental tests, wherein FIG. 11a shows dusting of a standard market material, and FIG. 11b shows a dusting of a linerless label according to this specification.

Figure 2:
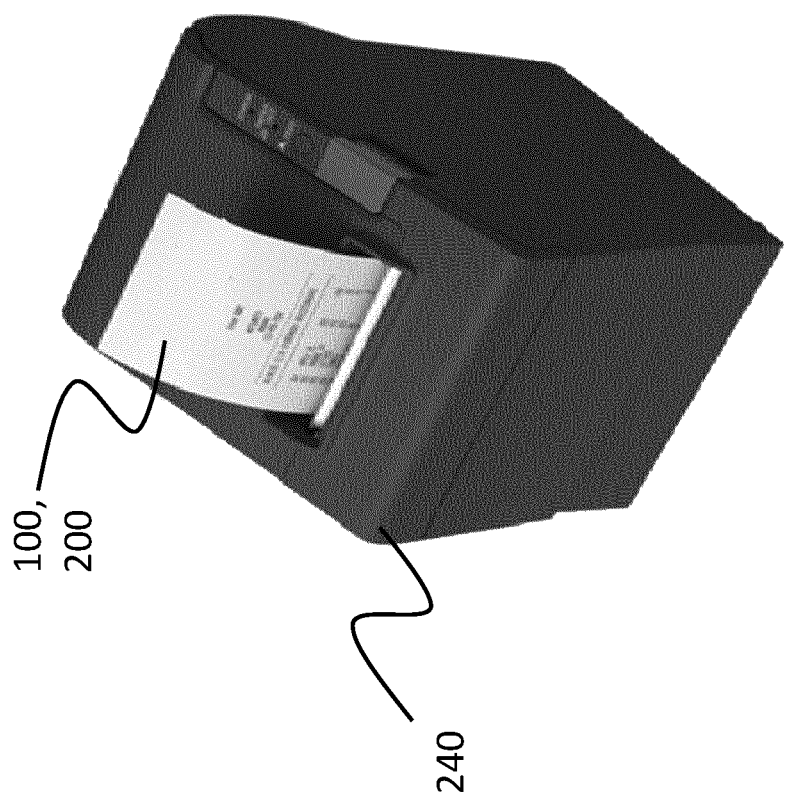
FIG. 2 illustrates, by way of an example, a schematic representation of a label printer useable with linerless label web according to the disclosure.

The figures are schematic and are intended to illustrate the general principles of the disclosed solution. Therefore, the illustrations in the Figures are not necessarily in scale or suggestive of precise layout of system components.

DETAILED DESCRIPTION

The solution is described in the following in more detail with reference to some embodiments, which shall not be regarded as limiting.

In this specification, references are made to the figures with the following numerals and denotations:

$S_x$, $S_y$, $S_z$ 3D coordinates,
MD machine direction, first direction,
CD cross direction, second direction,
A1 positional amplitude,
P1 one period
WL positional wavelength,
WMR width of a machine roll,
WCR width of a customer roll,
100 linerless label web,
110 face,
111 first side, i.e., top side,
112 second side, i.e. bottom side,
113 base layer, such as a paper,
114 intermediate layer,
115 direct thermal printable coating,
116 top coating of the face,
120 adhesive coating (PSA),
121 adhesive coating,
130 release coating,
150 adhesion-free area,
200 linerless label, label,
240 label printer,
401 arranging a face,
402 applying water-based adhesive,
403 arranging adhesion-free areas,
404 ensuring pre-determined level of moisture,
405 drying the adhesive coating,
406 transferring the adhesive onto face material,
407 winding the material into linerless roll,
560 drying unit,
561 drying device,
570 linerless label roll,
580, coating unit for applying adhesive,
590 moisturizing unit for ensuring pre-determined level of moisture,
611 carrier material,
611b web material,
612 face unwinder,
650 cooling cylinder,
660 roll nip,
690 adhesive removal unit,
710 carrier unwinder,
770 linerless label web winder, and
780 carrier rewinder.

In this specification, the term "comprising" may be used as an open term, but it also comprises the closed term "consisting of". Thus, unless otherwise indicated, the word "comprising" can be read as "comprising or consisting of".

For the purpose of the present description and the claims, unless otherwise indicated, all ranges include any combination of the maximum and minimum points disclosed and include any intermediate ranges therein, which may or may not be specifically enumerated herein.

Unit of temperature expressed as degrees C. corresponds to ° C.

Percentage values relating to an amount of a material are percentages by weight (wt. %) unless otherwise indicated.

All percentage values relating to an amount of a material refer to dry weight, unless otherwise indicated.

Term "web" refers to a continuous sheet of material. The web is generally processed by moving over rollers. Between processing stages, webs may be stored and/or transported as rolls.

In this application, the term "linerless label web" refers to a continuous direct thermal web comprising a face 110 and pressure sensitive adhesive 120, wherefrom the linerless labels 200, i.e. the individual labels, may be separated. Conventional linerless label webs may not have the same challenges as the direct thermal linerless label webs due to the direct thermal coating therein, and the typical end use in on-demand printing.

In this application, the terms "label", "linerless label" and "adhesive label" refer to an individual direct thermal label product 200 separated from the direct thermal linerless label web 100 to be applied onto an article, unless otherwise indicated. The label 200 may be adhered onto an article by using an adhesive. Thus, in this application, the terms "label", "linerless label" and "adhesive label" refer to a product comprising the direct thermal face 110 and the pressure sensitive adhesive coating 120, unless otherwise indicated.

The terms "linerless label (web)" and "label 100, 200" refers to the label 200 and/or to the linerless label web 100.

Term "machine direction" refers to manufacturing direction of a web. Machine direction may also refer to a circumferential direction of a roll. Further, longitudinal direction of a web refers to the machine direction. In this application, the term "first direction" refers to the machine direction. Terms "cross direction" and "cross machine direction" and "transversal direction" refer to a direction that is transversal to the machine direction. In this application, the term "second direction" refers to the cross direction.

The term "face" refers to a substrate of the label, also called as a face stock or a face material. In this application, the face comprises a base layer, a direct thermal printable coating, and an intermediate layer between the base layer and the direct thermal printable coating. In an advantageous embodiment, the base layer is an uncoated paper.

In this application, the term "adhesive coating" refers to a coating comprising adhesive. Preferably, the adhesive coating comprises a water-based acrylic adhesive. The adhesive coating may further comprise e.g. a silicone additive.

The terms "adhesive layer" and "adhesive coating layer" refers to a layer of an adhesive, which layer may be a continuous or non-continuous layer. The adhesive layer may comprise adhesive areas such as, for example, adhesive stripes and/or adhesive spots.

The term "PSA" refers to pressure sensitive adhesive(s).

Face

FIG. 1b illustrates, by way of an example, an $S_x$, $S_y$-cross-section of a face. The face 110 is the layer that is adhered to a surface of an article during labelling through an adhesive coating.

The face 110 comprises a first side 111 and a second side 112 (shown in FIG. 1a). The top side (first side 111) of the linerless label (web) can be printable by using heat. The second side 112 is an adhesive side.

The face 110 of the direct thermal linerless label web has a multilayer structure comprising at least three layers. The face comprises at least a base layer 113, which can be a base paper or a filmic material, a direct thermal coating layer 115, and an intermediate layer 114 left in between the direct thermal coating layer 115 and the base layer.

Further, the face 110 may contain additional layers. The face may comprise, for example, one or more than one top coating 116 on the direct thermal coating layer 115 to protect the thermal coating. The top coating 116 may comprise or be based on, for example, polyvinyl alcohol. The top coating may protect the direct thermal coating at least during a manufacturing process of the direct thermal linerless label web. The top coating may protect the top surface and/or print of the face against rubbing or other external stress.

In addition to the top coating 116, or alternatively, the face may comprise, for example, one or more than back coating on the second side 112 of the face 110. The back coating may comprise or be based on, for example, polyvinyl alcohol. The back coating may improve anchoring of the adhesive 120, 121 to the face 110. In an embodiment, the face does not have said back coating layer but the water-based pressure sensitive adhesive 120 is directly in contact with base layer, without any further coating layers between the PSA and the base layer.

The linerless label (web) 100, 200 may further contain one or more barrier layers to prevent chemical substances from migrating through a surface of the first side 111 of the face or a surface of the second side 112 of the face, or other interfaces of the linerless label (web) 100, 200. In an embodiment, the linerless label web does not have any additional barrier layer.

A grammage of the face 110 is preferably at least 45 g/m$^2$, more preferably at least 50 g/m$^2$. Further, the grammage of the face is preferably less than 80 g/m$^2$, more preferably equal to or less than 75 g/m$^2$. Grammage may be, for example, in a range between 45 g/m$^2$ and 80 g/m$^2$ or in a range between 50 and 75 g/m$^2$. Said grammage can be particularly suitable for the linerless label comprising the direct thermal printable coating, and for use in on-demand linerless label printers. The grammage can be measured according to standard ISO536.

The face 110 may have a static sensitivity below 100 degrees C., preferably in a range between 75° C. and 95° C. The static sensitivity needs to be high enough so that the product is not darkening before printing, for example during transportation. However, the linerless label (web) 100, 200 should be sensitive enough to be thermally printable.

The face 110 may have a caliper in a range between 60 µm and 85 µm, measured according to ISO534. If the face it is too thin, the linerless label (web) 100, 200 may be difficult to handle. For example, if the face is very thin, a stiffness of the linerless label web may go too low causing the linerless label web to be too sloppy. Thus, the linerless label (web) may be difficult to manufacture and/or the linerless label (web) may cause problems when used with a linerless label printer.

The linerless label (web) may have a PPS10 roughness in a range between 0.9 µm and 1.5 µm, preferably in a range between 0.9 µm and 1.3 µm, and most preferably in a range between 0.9 µm and 1.2 µm determined from the top surface of the linerless label (web) according to ISO standard ISO 8791-4. For example, by using a face comprising a paper, if the paper is too rough, the life of a print head may decrease too much.

The linerless label (web) may have a brightness higher than 85% (R457) when measured according to standard ISO2469. Therefore, the linerless label may look nice. Further, high brightness may create a contrast between the symbols/letters. Thus, if the letters comprise some machine-readable letters, the letters may be easily read thanks to said brightness.

The linerless label (web) may have an opacity higher than 80%, such as in a range between 80 and 90, when measured according to standard ISO2471. Thanks to said opacity, the surface of the linerless label may not be too transparent for a machine, or a human eye, to read.

The linerless label (web) may have a tensile strength in the machine direction (i.e., the first direction) higher than 40 N/15 mm, preferably higher than 45 N/15 mm, when measured according to standard ISO1924/2. Thus, dimensional stability of the linerless label (web) may be improved, which may have a positive effect on manufacturing process and printing process.

The linerless label (web) may have a tensile strength in the cross direction (i.e., the second direction) higher than 10 N/15 mm, when measured according to standard ISO1924/2. Thanks to said strength, a dimensional stability of the linerless label may be improved, which may affect manufacturing process and printing process.

Stiffness of the linerless label web may be in a range between 0.15 mNm and 0.30 mNm, determined in the machine direction MD of the linerless label web. Stiffness of the linerless label web can be measured according to ISO standard ISO 2494. Thanks to said stiffness range, stiffness of the linerless label web is not too low, which may cause the linerless label web to be too sloppy. Thus, the linerless label web may not cause too many challenges when used with a linerless label printer. Furthermore, thanks to said stiffness, functioning of a guillotine in linerless printers and easiness of a cutting process therein may be improved, which may further decrease dusting caused by the cutting process. Thus, a combination of said stiffness, the intermediate layer, and the acrylic adhesive may significantly reduce dust and adhesive accumulation to a guillotine blade of an on-demand printer. In an embodiment, stiffness of the linerless label web is in a range between 0.05 mNm and 0.20 mNm, determined in the cross direction of the linerless label web.

Face: Base Layer

The base layer of the face 110 may comprise or consist of a paper. Alternatively, the base layer of the face 110 may comprise or consist of a filmic material. The filmic material may be made of polyethylene (PE), polypropylene (PP), or biaxially oriented polypropylene (BOPP). Also, other suitable materials, such as different types of polyesters such as polyethylene terephthalate (PET) or polyethylene(s) are possible.

Regardless the base layer being either fiber based or filmic, the composition of the intermediate layer 114 disposed between the base layer and the direct thermal printable coating is important in affecting the amount of dust when the linerless label material is cut and separated into labels in a thermal printer. It seems that the composition of the intermediate layer 114 affects for it's part how the internal pressure becomes spread into the label material layers in the guillotine cutting operation. The composition of the intermediate layer seems to prevent the creation of the dust not only from the intermediate layer itself but also from the other layers of the label material. In case of filmic base layer, the structure of the intermediate layer 114 seems to minimize the pressure stress created in the guillotine to spread wider from the cut line into the label material and thus affecting smaller area around the cut line.

Preferably, the base layer comprises or consists of the paper. Advantageously, the base layer consists of an uncoated paper.

The face 110 may comprise a base paper comprising natural fibres as its main raw material. Natural fibres refer to any plant material that contains cellulose. The natural fibre may be wood based. The wood based natural fibre may be from softwood trees, such as spruce, pine, fir, larch, douglas-fir, or hemlock, and/or from hardwood trees, such as birch, aspen, poplar, alder, eucalyptus, or acacia, or from a mixture of softwoods and hardwoods.

The base paper, if used, preferably comprises wood based natural fibres. The wood based natural fibres are preferably main fibre material of the base paper. The face 110 may comprise cellulose fibers from hardwood and/or softwood. A mixture of hardwood and softwood may be used to improve the internal bond strength of the face 110.

The base layer can be so-called wood-free paper. Wood-free refers to chemical pulp, such as Kraft pulp. In accordance with an embodiment, a pulp used for making the face does not contain any kind of mechanical pulp due to high quality requirements of the face. The base paper 113 of the face 110 may be the wood-free paper comprising fibers e.g. from softwoods and/or hardwoods.

The base layer 113, such as the uncoated base paper, may further comprise, for example, at least one mineral filler selected from a group comprising clay, calcined clay, kaolin, natural ground calcium carbonate, precipitated calcium carbonate, talc, calcium sulphate, and titanium dioxide. Total amount of the mineral fillers in the base layer 113 may be less than 18 wt. %, preferably less than 13 weight-%, more preferably less than 8 weight-%, and most preferably less than 5 weight-%, for example between 0 wt.-% and 4 wt.-%, based on the total weight of the base layer 113. The mineral fillers may decrease costs of the manufactured product. However, the mineral fillers may also decrease strength properties of the face 110. Further, if the base layer comprises too much fillers, some properties of the face 110 may be compromised. For example mineral fillers may increase dusting of the face, which may cause blocking and other problems to on-demand printers. Dusting tendency of the direct thermal linerless label web may be decreased if amount of mineral fillers in the base layer is substantially low.

Increased amount of natural fibres may decrease dusting of a base layer in on-demand printers. Therefore, dusting tendency of the base paper 113 may decrease along with increased natural fiber content of the base paper. Thus, natural fibre content of the base paper, if used, may be at least 75 wt. %, preferably at least 80 wt. %, more preferably at least 85%, and most preferably at least 88 wt. %, a based on the total weight of the base paper 113.

In this specification, the term "base paper" refers to a paper without a pigment coating layer. The base paper may be calendered with a calender or a supercalender to obtain a high-density surface. The base paper may be coated in order to obtain an intermediate layer on the base paper.

The base paper may be manufactured from FSC™—certified (mix credit) pulp. Thus, the face may comprise or consist of environmentally friendly material. Thus, the novel linerless label (web) may be better for the environment than some other kind of face materials.

Face: Intermediate Layer

The base layer 113 may be coated in order to form the intermediate layer 114 interposed between the base layer 113 and the direct thermal coating 115. A coat weight of the intermediate layer 114 may be in the range of 0.9 to 7 g/m² per side, preferably in a range between 1 g/m² and 5 g/m², more preferably in a range between 1.3 g/m² and 4 g/m² and most preferably in a range between 1.6 g/m² and 3 g/m². Thanks to the intermediate layer, a quality of the direct thermal coating may be improved. Further, amount of expensive direct thermal coating needed to obtain good printable properties may be decreased. Still further, thanks to substantially low coat weight of the intermediate layer, dusting related problems may be avoided, or at least diminished.

The intermediate layer may comprise at least one mineral pigment. The mineral pigment may be selected from a group comprising clay, calcined clay, kaolin, natural ground calcium carbonate, precipitated calcium carbonate, talc, calcium sulphate, and titanium dioxide.

Total amount of the mineral pigments in the intermediate layer 114 may be less than 85 wt. %, for example in a range between 0 wt. % and 80 wt. %. Preferably, total amount of the mineral pigments is less than 75%, for example in a range between 5 and 70 wt.-%, more preferably in a range between 10 wt.-% and 65 wt.-%, and most preferably equal to or less than 60 wt.-%, based on the total weight of the intermediate layer 114. The mineral pigments may be used in order to provide smooth surface for the intermediate layer 114. Thus, a quality of the direct thermal coating layer may be improved. Further, amount of expensive direct thermal coating needed for the layer may be decreased. However, mineral fillers may increase dusting of the face, which may cause blocking and other problems to on-demand printers. The dusting of the intermediate layer may be particularly problematic, as the intermediate layer does not typically comprise fibers which might partly bind the mineral particles. Thus, preferably, amount of mineral pigments is substantially low in the intermediate layer.

Alternatively, or in addition to the mineral pigments, the intermediate layer may comprise a non-mineral pigment in order to decrease amount of mineral pigments in the intermediate layer. The non-mineral pigments may comprise, for example, polymeric material. The polymeric material may comprise, for example, thermoplastic polymeric material, such as thermoplastic biopolymer(s). Thanks to the non-mineral pigment, dusting of the direct thermal linerless label web may be decreased.

The non-mineral pigments may comprise, for example, an expandable plastic. The shape of the non-mineral pigments may be, for example, balloon-like particles. A diameter of non-mineral pigment particles may be, for example, some micrometer.

Further, the intermediate layer can comprise a binder. The binder may comprise one or more than one of starch, polyvinyl alcohol (PVA) and latex. The latex may comprise a styrene butadiene latex (SB) and/or a styrene acrylic latex (SA). These binders may be used to decrease dusting tendency of the linerless label web. Preferably the latex, if used, is styrene butadiene latex (SB latex).

Amount of the binder(s) in the intermediate layer may be at least 15 wt. %, such as in a range between 20 wt. % and 50 wt. %, preferably in a range between 25 wt. % and 45 wt. %, more preferably in a range between 30 wt. % and 42 wt. %, and most preferably in a range between 33 wt. % and 40 wt. %, based on the total weight of the intermediate layer 114. The binders may be used to bind pigment particles together, in order to form an even coating layer. Thanks to said amount of binders, dusting problem of the direct thermal linerless label web may be decreased.

The combination of base paper and the intermediate layer may be calendered or a supercalender to obtain a high-density surface before applying the direct thermal coating on the intermediate layer. If the intermediate layer is calendered, smoothness of the intermediate layer may be improved. Thus, a quality of the direct thermal coating on the intermediate layer may be improved.

In an embodiment, the intermediate layer of the produced linerless label (web) 100, 200 may have a thickness in a range between 2 μm and 6 μm, preferably in a range between 2.5 μm and 5.5 μm, and most preferably in a range between 3 μm and 5 μm. The thickness of the intermediate layer needs to be high enough to fill the pores of the surface of the base paper. Thus, the thickness of the intermediate layer may depend on smoothness of the surface. Further, the thickness of the intermediate layer needs to be high enough to form a smooth surface for the direct thermal coating. Thanks to the intermediate layer, it is possible to form smooth surface for the direct thermal coating.

Thus, the face 110 can have the intermediate layer 114. The intermediate layer 114 may have an effect of reducing heat transfer from a thermal coating to the base paper 113. This may enable enhanced or high-resolution print to be formed. The intermediate layer 114 may further have effect of providing smoothness to the substrate, i.e. the top surface of the face 110. Smoothness of the face 110 comprising paper has positive effect on printing, for example by providing better resolution. Thus, the intermediate layer may have positive effect on printing quality. Furthermore, the intermediate layer (if having low enough grammage and/or content of mineral pigments) may decrease dusting tendency of the face 110.

Face: An Example of a Direct Thermal Printable Coating

The face 110 comprises a direct thermal printable coating 115. Thus, the face 110 may be called a thermally direct printable face.

The direct thermal printable coating 115 is arranged to provide thermal printability for the face 110. The direct thermal printable coating is arranged to form a thermal sensitive, reactive layer changing color during the thermal printing. The thermal coating comprises reactive components. The thermal coating may comprise a matrix. The matrix may comprise a dye and a developer.

The thermal coating matrix in a solid state is heated by a thermal print head above its activation point and/or melting point. The dye of the thermal coating may comprise a leuco type dye. The leuco type dye is arranged to react with an acid and change into a colored form. Thermal coating may comprise a dye, a developer, a sensitizer, a binder, and a stabilizer.

The developer can be arranged to co-react with the dye above activation temperature during thermal printing. Reaction of the dye with the developer is arranged to trigger color formation. Developer may comprise sulfonyl ureas, zinc salts of substituted salicylic acids or phenols, for example Bisphenol A (BPA) or Bisphenol S (BPS). The thermal coating may preferably be BPA free, Bisphenol (BP) free or Phenol free for increased chemical safety.

Sensitizer may be used in a thermal coating to decrease melting point of a dye and/or a developer. Dye and developer are arranged to react when heated above melting point of matrix of the thermal coating. The melting point of the matrix may depend on melting point values of its components. Thermal threshold of the thermal coating is melting point of the component of the thermal coating having the lowest melting point. Sensitizer of the thermal coating may be arranged to decrease melting point of dye and/or developer. This has effect of proving accuracy to the melting point and/or optimizing temperature of color change and/or facilitating mixing of dye and developer.

Optionally, the thermal coating may comprise stabilizers. Dyes in thermally sensitive paper may be unstable tending to return to their original colorless crystalline form. The thermal paper may be sensitive, for example, to hot and humid external conditions. In order to stabilize the metastable glass formed by leuco dye, developer and sensitizer, a stabilizer may be added to the mixture. Stabilizers may affect inhibiting recrystallization of the dye and developer and/or stabilizing the print.

Binder of the thermal coating may have an effect of facilitating the thermal coating to adhere to a base substrate or to a pre-coat. Binder may comprise double bonds. The binder may comprise polyvinyl alcohol (PVA) or latex, for example a styrene butadiene latex (SB) or a styrene acrylic (SA).

Sensitivity of the thermal coating refers to the degree to which it reacts to a given amount of heat or energy. Sensitivity is a decisive factor in the selection of the right thermal coating or thermal paper. It may be depicted in graphs plotting a curve of image density or optical density (OD) against the amount of heat or energy transferred. Optical density is a measure of a relationship between incident and reflected light. An optical density of approximately 1.1 is usually a full black to the human eye. Lower optical densities thus correspond to varying shades of grey. Thermal coatings and thermal papers are typically characterized by using static and dynamic sensitivity.

Static sensitivity indicates the temperature at which a thermal paper will begin imaging, i.e. changing color. Thermal papers with low static sensitivity only begin imaging at high temperatures, for example at above 90 degrees C. Thermal papers with medium static sensitivity on the other hand begin imaging at lower temperatures, for example at between 80 and 90 degrees C. High static sensitivity thermal papers start to react even at lower temperatures, for example at 65-80 degrees C., or at 70-80 degrees C.

Dynamic sensitivity of thermal papers indicates in practice how fast a thermal paper can be printed. This is especially relevant in the selection of the right thermal paper for a particular thermal printer, since the higher the dynamic sensitivity of the paper, the faster the printer can operate without any settings having to be changed. Dynamic sensitivity is typically indicated as $mJ/mm^2$. Thus, thermal papers with low dynamic sensitivity require higher print head temperature and/or longer exposure, i.e. slower printing speed to achieve high optical density of the image. On the other hand, high dynamic sensitivities allow faster printing even with lower print head temperatures.

Dynamic sensitivity is challenging to categorize by using unambiguous, single numerical values (for example energy levels in $mJ/mm^2$) into low, medium, and high categories because the total energy level delivered into the paper does not directly correspond to a certain temperature reached in the thermal coating. The heat capacity of the thermal paper is related, for example, to the thickness of the paper and existence of different material or material layers. Thus, different amount of energy may be needed to heat papers having different thicknesses to the same temperature. Different paper thicknesses or thermal conductivity of various layers may cause different temperature levels in the thermal coating.

For example, at optical density 1.1 (full black for a human eye) very different energy levels may be required to reach such full color change in the thermal coating layer. A high dynamic sensitivity thermal paper may reach such optical densities already at energy levels below 15 mJ/mm$^2$, a medium dynamic sensitivity may require something around 20 mJ/mm$^2$, for example energies in the range of 15-25 mJ/mm$^2$, and a low dynamic sensitivity thermal paper may require energy levels even above 25 mJ/mm$^2$ for the same darkness of the print. Each of these papers may still start to have some color change in much lower energy levels, for example, already below 10 mJ/mm$^2$.

High static sensitivities may be preferred combined with high dynamic sensitivity allowing fast printing with economic and simple linerless printers. Temperature of the surface of a labelled item is not likely to exceed 65-70 degrees C., which allows the use of some thermal papers with medium static sensitivity, and more preferably thermal papers with high static sensitivity approaching those maximum surface temperatures of the labelled items. On the other hand, long term stability is not an issue in these short-lived applications making it possible to use more economical thermal papers which are not designed specifically for archiving or longer-term stability. Such high static and dynamic sensitivity of the thermal coating/paper may place challenges in manufacturing of the direct thermal printable linerless labels because it sets limit to the highest temperatures that the direct thermal face material can be exposed to during manufacturing of the linerless label product in order to prevent unwanted and premature color changes of the thermally sensitive coating.

Adhesive Coating

During a manufacturing process of the linerless label (web) 100, 200, an adhesive coating 121 is dried into a pressure sensitive adhesive coating 120. The adhesive coating (layer) 120, 121 can comprise water-based acrylic adhesive.

The label 200 and the linerless label web 100 disclosed herein comprise a pressure sensitive adhesive coating, which adhesive coating 120 is arranged on the second side 112 of the face 110. The pressure sensitive adhesive coating 120 may also be called a self-adhesive coating.

The pressure sensitive adhesive coating layer 120 may comprise one or more layers of water-based adhesive. If the PSA coating 120 comprises more than one layer of adhesive, the adhesive coating may have improved smoothness. For example, if the first adhesive coating layer comprises any small holes, these may be filled with the second adhesive coating layer.

The PSA may be permanent adhesive, or it may be removable or repositionable, or even ultra-removable. The PSA may have a working temperature from ambient to freezer temperatures.

In an embodiment, the pressure sensitive adhesive 120 may have a maximum tack value of equal to or more than 3 N, more preferably equal to or more than 4 N measured on glass according to FINAT test method FTM9. Said values may be suitable performance values for the pressure sensitive adhesive coating 120 of the direct thermal linerless label (web) 100, 200.

The pressure sensitive adhesive may be used for permanent linerless label (web) or removable linerless label (web). For removable linerless label (web), the maximum tack value may be between 3 N and 6 N measured on glass according to FINAT test method FTM9. For permanent linerless label (web), the maximum tack value may be equal to or more than 8 N, more preferably equal to or more than 10 N, and most preferably equal to or more than 17 N, measured on glass according to FINAT test method FTM9.

In an embodiment, the pressure sensitive adhesive 120 has a maximum tack value of equal to or less than 12 N, more preferably equal to or less than 6 N and most preferably between 3 N and 6 N as measured on glass according to FINAT test method FTM9. Said values may be particularly suitable performance values for the pressure sensitive adhesive coating 120 of the direct thermal linerless label (web) 100, 200 for quick service restaurants.

In another embodiment, the pressure sensitive adhesive 120 has a maximum tack value of equal to or more than 8 N, more preferably equal to or more than 10 N as measured on glass according to FINAT test method FTM9. Said values may be particularly suitable performance values for the pressure sensitive adhesive coating 120 of the direct thermal linerless label (web) 100, 200 for industrial food or retail labeling.

In another embodiment, the pressure sensitive adhesive 120 may have a maximum tack value of equal to or more than 15 N, more preferably equal to or more than 17 N as measured on glass according to FINAT test method FTM9. Said values may be particularly suitable performance values for the pressure sensitive adhesive coating 120 of the direct thermal linerless label (web) 100, 200 for logistic and warehouse.

Properties and characteristics of the PSA used herein may vary depending on the end use of the label in question. Some example properties are illustrated by Table 1 showing some example values and factors for the adhesives for different end uses.

TABLE 1

| | | Retail labelling | Logistic & warehouse | Industrial food | Quick service restaurant |
|---|---|---|---|---|---|
| Labelling environment | (degrees C.) | 18 . . . 25 | 10 . . . 25 | −2 . . . 8 | 18 . . . 30 |
| Labelling environment (substrate) | (degrees C.) | 8 . . . 25 | 10 . . . 25 | −20 . . . 8 | 8 . . . 60 |
| Environment (substrate) | | Dry | dry | condens. exists | condens. exists |
| Service temperature | (degrees C.) | 4 . . . 25 | 0 . . . 25 | −20 . . . 25 | 18 . . . 30 |
| Adhesive characteristics | | permanent | permanent | permanent | removable |
| Adhesion (tack) | N/25 mm FTM9 | ≥8 | ≥17 | ≥10 | 3 . . . 6 |
| Coat weight (dry) | (g/m$^2$) | 15 . . . 20 | 18 . . . 25 | 15 . . . 20 | 15 . . . 20 |

Within context of this specification, the PSA is most preferably water-based PSA. Water-based adhesives can provide better sustainability with less fossil based raw materials and less volatiles involved both during the manufacturing and during end use. These benefits can be seen, for example via Life Cycle Analysis for Cradle-to-Gate or Cradle-to-Grave.

Further, it may be easier to achieve a good anchorage level with water-based PSA onto the face 110 disclosed herein even without any additional primer being used. Thus, in an embodiment, the water-based pressure sensitive adhesive 120 is directly in contact with the face 110, such as the base layer of the face, without any further coating layers between the PSA and the face.

Still further, water-based adhesives may be designed to have approval for direct or indirect food contact (food-safety), which is a requirement in certain food related label end use areas.

The pressure sensitive adhesive can be suitable for high coating speeds. Preferably, the adhesive gives reticulation free coatings at coat weights of 10-30 g/m$^2$ (dry coat weight). The adhesive may be plasticizer-free and may be used on thermal papers (including economy grades) without issues of premature image development or image fade.

In an embodiment, the adhesive exhibits sufficient anchorage to the face 110 and resistance to face stock penetration, such that priming may not be required. Flat adhesion profile over extended dwell-time and/or sufficient cohesion in order to resist winging on curved surfaces may be preferred.

Preferably, the water-based PSA is acrylic-based. The water-based acrylic PSA may have many advantages over other kinds of PSAs. Water-based acrylic PSA may be very environmentally friendly. Further, tackiness of the product may improve thanks to the water-based acrylic adhesive. Further, hot melt adhesives may cumulate more easily into cutting machines than water-based acrylic adhesives and, furthermore, increase amount of dust in said machines. Still further, acrylic adhesives may have a longer open time, hence, linerless label (web) comprising water-based acrylic PSA may be removed after some seconds or minutes, if needed. On the contrary, hot melt adhesives cannot typically be removed from a surface, even if attached onto a wrong surface. Thus, removability of the water-based acrylic adhesive may be better than removability of the hot melt adhesives. Moreover, peel values of the acrylic based adhesive typically differ from peel values of the hotmelt based adhesives.

The adhesive may comprise a silicone additive. Traditionally, silicone cannot be readily mixed with water based acrylic PSA to form a stable adhesive emulsion. The water-based acrylic adhesive may therefore be supplied in the form of an aqueous dispersion comprising an emulsifier and the silicone additive. The silicone additive itself may be also in a form of a silicone emulsion before being mixed into the acrylic adhesive. The emulsifier may be required in order to form a stable adhesive emulsion while applying the water-based acrylic adhesive on a surface of a face or a carrier material.

In an embodiment, the adhesive in a form of the aqueous dispersion or emulsion may be further mixed with a wetting agent. In some embodiments, the wetting agent may be necessary to be able to coat the adhesive dispersion/emulsion on a siliconized surface when the adhesive coating is applied onto a separate siliconized carrier substrate for adhesive drying and curing, or alternatively if it is applied directly on the siliconized thermal face for drying and curing.

The silicone component in the emulsified silicone additive, if used, may be a polydimethylsiloxane. In this embodiment, the silicone additive is preferably mixed with the water-based adhesive together with an emulsifier, hence, a substantially uniform adhesive layer 120, 121 comprising said silicone additive may be formed.

The adhesive coating 120, 121 may comprise or consist of the mixture comprising said water-based acrylic adhesive, and optionally at least one emulsifier and the silicone additive. In this embodiment, the silicone additive used in the adhesive layer is preferably recyclable. In an embodiment, the adhesive coating comprises at least one emulsifier and at least one wetting agent.

In an embodiment, a silicone additive is added to an acrylic water-based adhesive in order to form the adhesive coating 121. This combination may significantly reduce adhesive accumulation to a guillotine blade of an on-demand printer. Further, dust accumulation to a guillotine blade of an on-demand printer may be decreased. Furthermore, the acrylic water-based adhesive may be environmentally friendly adhesive, which may be used e.g. with food materials. Thus, the linerless label (web) 100, 200 may be used with food packages.

Thus, the linerless label (web) 100, 200 may comprise the intermediate layer 114 comprising reduced amount of mineral particles together with the adhesive comprising silicone additive. The combination of water-based acrylic adhesive and silicone additive in the adhesive coating 120, 121 together with said intermediate layer 114 may significantly reduce dust and adhesive accumulation to rolls and other parts of a web guide of the linerless printer. This may bring advantages as it may give a wider room to use more aggressive adhesives without shortening the service cycle of an on-demand printers. Further, this combination may enable lengthened service cycle. Therefore, thanks to the embodiment having acrylic water-based adhesives together with the silicone additive and the intermediate layer, the direct thermal linerless label (web) 100, 200 may be used with linerless label printers so that the service cycle of the printer may not be shortening.

The pressure sensitive adhesive layer 120 may have a coat weight in a range between 10 and 30 g/m$^2$ (dry coat weight). Preferably, the adhesive layer 120 has a coat weight in a range between 15 g/m$^2$ and 25 g/m$^2$ (dry coat weight), most preferably in a range between 16 g/m$^2$ and 21 g/m$^2$. Preferably, to obtain an adhesive layer that is good enough to attach the linerless label to the surface of an item without being too expensive, the adhesive is a water-based PSA, which is acrylic-based.

As discussed, the adhesive coating may comprise an emulsified silicone additive. The silicone additive in the adhesive coating 120, 121 may improve the easiness of cutting of the label material, particularly with an on-demand linerless label printer. Furthermore, the silicone additive in the adhesive coating 120, 121 may decrease amount of dust in on-demand printers. Further, the silicone additive in the adhesive coating 120, 121 may improve the self-woundability of the linerless label web 100. Moreover, silicone additive may help the linerless label web 100 to be self-wound around itself without tendency of blocking the adjacent layers of the linerless label web 100 to each other.

If the adhesive layer comprises the silicone, the amount of emulsified silicone additive in the adhesive layer can be equal to or more than 1 wt.-%, more preferably equal to or more than 1.5 wt. %, and most preferably equal to or more than 2 wt. %, calculated from the total dry weight of the adhesive coating layer. This grammage may provide an improved usability of the linerless label for printers. Further, the amount of the emulsified silicone additive can be equal to or less than 6 wt. %, more preferably equal to or less than 5 wt. %, and most preferably equal to or less than 4 wt. %, Thus, it may be possible to obtain cost effective solution having good adhesive properties. The amount of the emulsified silicone additive on the adhesive layer may be, for example, between 1 to 6 wt. %, or between 2 wt. % and 4 wt. %, calculated from the total dry weight of the adhesive coating layer.

In an embodiment, the amount of emulsified silicone additive in the adhesive layer may be equal to or more than 0.1 g/m². In this embodiment, the amount of the emulsified silicone additive in the adhesive layer may be at least 0.15 g/m², more preferably at least 0.2 g/m² (dry grammage) to provide an improved usability of the linerless labels for printers. Furthermore, the amount of the emulsified silicone additive may be 1.7 g/m² at the most, more preferably 1.3 g/m² at the most, and most preferably equal to or less than 1.1 g/m² (dry grammage) in order to provide cost effective solution. The amount of the emulsified silicone additive on the adhesive layer may be, for example, between 0.15 and 1.5 g/m², or between 0.2 and 1.2 g/m² (dry grammage).

The silicone additive, if used, may be supplied in the form of an aqueous emulsion. In order to form substantially uniform mixture, the silicone additive is preferably added on the form of an aqueous emulsion which contains an emulsifier. The emulsifier may lower the surface tension between the water-based acrylic adhesive and the silicone. The emulsifier agent may comprise hydrophilic and hydrophobic groups. Thus, in an embodiment, the emulsifier agent molecules may encapsulate silicone with their hydrophilic parts extending out.

If used, the emulsifier and/or the wetting agent is/are preferably anionic or nonionic. More preferably, the emulsifier and/or the wetting agent may be anionic. Thanks to the emulsifier, the silicone additive may not float in the water, but the silicone additive can be mixed ("dissolved") in the water-based solution. Further, if the wetting agent is used, easiness of the adhesive coating process may be improved.

The silicone additive, if used, may be added into the adhesive coating by adding silicone emulsion into acrylic water-based adhesive, thereby forming the adhesive coating 121. Silicone emulsion, when mixed to the water-based adhesive in a range between 1 wt. % and 6 wt. %, preferably in a range between 2 wt. % and 4 wt. %, may modify the adhesive performance so that immediate adhesion for very quickly moving metallic blade in the printer/labelling process is significantly decreased. Further, the combination of the acrylic water based adhesive comprising the silicone additive and the intermediate layer 114 having decreased mineral content may decrease dusting tendency of printers, hence, improving the use life of the thermal printer.

In an embodiment, the adhesive coating layer 121 comprises the silicone emulsion, wherein the silicone emulsion may have an average particle size in a range between 0.1 microns and 1 micron. This may improve the properties of the emulsified silicone additive. Preferably, the average size of the particles is between 0.1 microns and 0.4 microns, and most preferably between 0.1 microns and 0.2 microns.

The pressure sensitive adhesive coating 120 of the produced linerless label (web) 100, 200 may have a thickness of at least 10 μm, preferably at least 12 μm or at least 14 μm, and most preferably equal to or more than 16 μm. The coat weight of the PSA needs to be high enough to fill the pores of the surface. Thus, the thickness of the PSA may depend on the surface to be coated. Further, the amount of the PSA needs to be high enough to attach the label onto the surface of an object. Advantageously, said thickness of the pressure sensitive adhesive coating 120, 121 is equal to or less than 40 μm, preferably equal to or less than 30 μm, more preferably equal to or less than 25 μm, and most preferably equal to or less than 20 μm. The thickness of the adhesive layer may be, for example, between 12 and 25 microns. Therefore, it is possible to obtain an adhesive layer that is good enough to attach the linerless label to a surface of an item without being too expensive.

As discussed, the adhesive layer applied on the linerless label may comprise a silicone additive, i.e., a silicone polymer-based compound. The silicone compounds may improve the easiness of the usage of the linerless label (web) 100, 200. The chemistry of the silicone affects the force required to release the adhesive layer 120 (and therefore the face layer) from a substrate. The silicone additive in the adhesive coating may protect the adhesive coating layer 120, 121 and allow efficient handling when the label is adhered to a substrate. Further, while protecting the adhesive layer, the silicone additive may further protect the linerless label printer from the adhesive layer. The silicone additive may protect the linerless label printer, because the silicone additive may decrease a surface energy of the adhesive layer. Thus, the label may be easily cut so that the adhesive is not attaching to the printer. Therefore, the linerless label adhesive coating comprising adhesive and silicone additive may be used for minimizing adhesive accumulation to a cutter blade, rolls, and web path in linerless printers. Still further, the silicone additive may, together with the certain intermediate layer, protect the linerless label printer from dust.

The adhesive coating 120 may be plasticizer-free. This may have several advantages as plasticizers may migrate into the product and cause some problems. For example, food safety might be compromised.

Thus, the novel linerless label (web) 100, 200 may have several advantages. The linerless label (web) may remain fully removable from printed/over-lacquered surfaces. Still further, the linerless label (web) 100, 200 may have sufficient anchorage and resistance to paper-penetration. Moreover, the linerless label (web) 100, 200 may have flat adhesion profile over extended dwell-time and sufficient cohesion to resist winging on curved surfaces.

If the adhesive coating 120 comprises the silicone additive, the silicone additive may help to prevent a linerless label printer 240 from an accumulation of the adhesive to a blade and rolls of the linerless label printer and also prevent or at least diminish some dusting related problems. Said accumulation of the adhesive and dust might result shortened printer service cycle. The silicone additive in the adhesive coating, particularly together with the face having decreased mineral weight, may substantially decrease dusting and accumulation of the adhesive and dust to linerless label printer.

Thus, printer service cycle may be substantially improved. The adhesive coating comprising silicone additive and PSA can be used on thermal papers (including economy grades) without issues of premature image development or image fade.

Furthermore, it might be easier to achieve good anchorage with water-based acrylic PSA onto the substrate, in some cases even without any additional primer being used.

Adhesive Coating Layer

The adhesive coating layer may be a continuous layer or a non-continuous layer.

Thus, the adhesive coating layer of the linerless label web may be a continuous adhesive layer, wherein the adhesive coating layer does not have any adhesion-free areas.

Alternatively, the adhesive coating layer of the linerless label web may be a non-continuous adhesive layer. The non-continuous adhesive layer can comprise adhesive areas and adhesion-free areas. Advantageously, the adhesive coating layer comprises one or more adhesive areas and one or more adhesive free areas.

The adhesive coating layer may comprise or consist of, for example, adhesive stripes and/or adhesive spots and/or other shaped adhesive areas.

The adhesive coating layer may comprise, for example, at least one of:
straight continuous stripes,
positionally alternating continuous stripes, and
patched pattern gumming.

Adhesive Stripes

Figure 6:
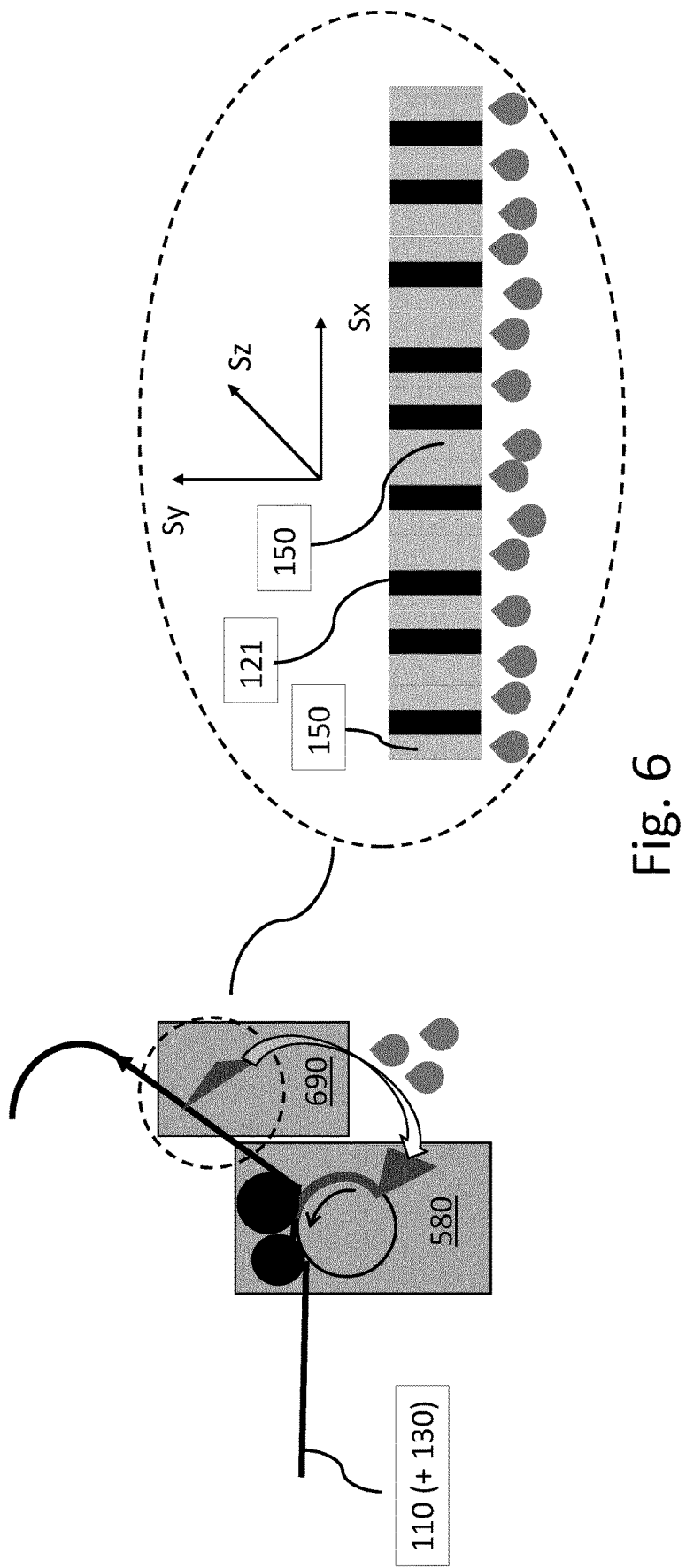
FIG. 6 illustrates, by way of an example, a detail of a manufacturing method and an apparatus according to an embodiment.
Figure 7:
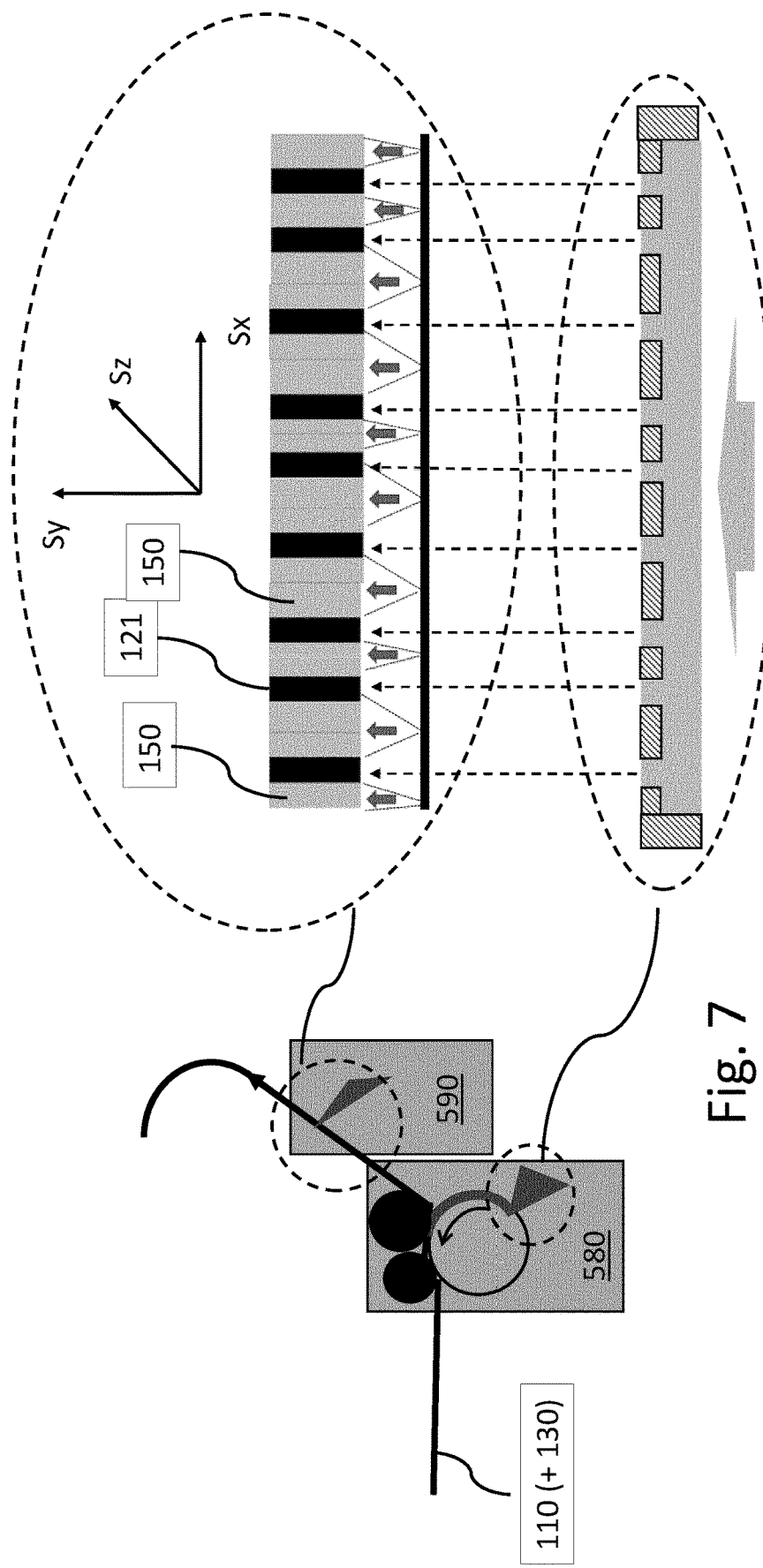
FIG. 7 illustrates, by way of an example, a detail of a manufacturing method and an apparatus according to an embodiment.

The adhesive coating layer 120, 121 may be a patterned coating layer as shown e.g. in FIGS. 6 and 7. By arranging adhesive coating 120, 121 in stripes in the longitudinal direction of the label web 100 (i.e. the first direction), performance of the linerless label web 100 in the on-demand printer as well as the manual handling of the label after printing may be significantly improved. The adhesive stripes may be in a form of straight continuous stripes, or in a form of alternating continuous stripes.

In an embodiment, total coverage of the adhesive coating may be equal to or less than 90%, preferably equal to or less than 80%, calculated from the total area of the second side of the face. In addition, the total coverage of the pressure sensitive adhesive coating may be equal to or more than 10%, more preferably equal to or more than 30%, and most preferably equal to or more than 40%, calculated from the total area of the second side of the face. Said total coverage may prevent bleeding of the adhesive in the label roll and aid keeping the printer mechanics clean of adhesive and dust.

For some end uses, it may be essential to leave continuous adhesion-free areas/stripes 150 near the longitudinal edges of the label web 100. These adhesion-free areas/stripes 150 near/on the longitudinal edges may correspond to minimum of 10%, or minimum of 30% or even more than 50% of the total width of the label web 100. The rather wide non-adhesive area on the outer edges of the label may prevent any bleeding of the adhesive in the label roll and aid keeping the printer mechanics clean. The adhesion-free areas may be arranged symmetrically or nearly symmetrically on both longitudinal edges of the label web 100. Thus, it may be possible to ease travel of the label inside the printer and/or to help to be able to grip the labels with fingers not touching the sticky PSA. If the width of the adhesion-free areas 150 is selected to be non-symmetric, the narrower of these areas on either longitudinal edge of the label web 100 may correspond to minimum of 10%, 15%, 25% or even more than 35% of the total width of the label web 100.

For example, a single PSA stripe in the middle of the linerless label 200 ranging in width from 10 to 25 mm may provide good balance between tack and manual handling and most importantly, provide good long term performance in the compact, on-demand linerless printers. The rather wide nonadhesive area 150 on the outer edges of the label may prevent any bleeding of the adhesive in the label roll and aid keeping the printer mechanics clean. Yet, the PSA area is wide enough to provide good enough traction in the printer rolls in order to traction the label through the printer. In an embodiment, in order to obtain at least some of the above-mentioned advantages, the adhesion-free areas/stripes 150 near (or on) the longitudinal edges of the label web 100 may have a width in a range between 10 and 25 mm.

The adhesion-free areas may comprise a residual amount of the adhesive coating in a range between 0 $g/m^2$ and 5.0 $g/m^2$, such as in a range between 0.5 $g/m^2$ and 4.0 $g/m^2$. In an embodiment, the adhesion-free areas do not comprise any residual amount of the adhesive coating.

It should be noted that typically the coating thickness of the adhesive coating as well as the width of the adhesive stripes (as well as the adjacent adhesive or adhesion free areas) can remain substantially constant over the length of the web despite of the positional alternation. This allows for technically easier implementation of the coating process as well as simplifies curing/drying of the adhesive layer. In the customer rolls, for example, the decreased adhesive coating may improve the functioning of the motorized or manual guillotine in linerless printers. Still further, linerless labels comprising adhesive stripes might be easier to cut through mechanically in such devices with less adhesive residue left on the cutting blade or edge. Moreover, this embodiment may reduce an accumulation of the adhesive coating to a linerless label printer. Said accumulation of the adhesive might result more dusting related problems as dust can be adhered together with the adhesive to the printer and, hence, result shortened printer service cycle. Thus, thanks to this embodiment, dusting related problems may be avoided, or at least diminished.

Thus, this embodiment comprising adhesive stripes may have one or more of the following advantages:
No adhesive bleeding/oozing,
Dusting related problems may be avoided, or at least diminished,
Adhesive residue reduction in any parts contacting the web during manufacturing (coating, slitting) or end use (printer), and
Acrylic water-based adhesive may be environmentally friendly adhesive, which may be used e.g. with food materials. Further, they may have a longer open time, hence, linerless label (web) comprising water-based acrylic PSA may be removed after some seconds or minutes, if needed.

Positionally Alternating Adhesive Stripes

The linerless label web may comprise straight adhesive stripe(s) and/or positionally alternating adhesive stripe(s).

The linerless label web may comprise at least one positionally alternating adhesive stripe per each customer roll. Thus, the machine roll may comprise at least one positionally alternating adhesive stripe per each customer roll to be obtained from the machine roll. An example of the positionally alternating adhesive stripes is shown in FIGS. 10*a-b*.

In this embodiment, the method for manufacturing the continuous linerless label web may comprise the following steps:
supplying the face optionally with a release coating arranged on the first side,
providing positionally alternating continuous adhesive stripes on the second side of the web with
predetermined number of the stripes (A) in cross-direction of the web,
predetermined width of the stripes (B) in the cross-direction of the web,
predetermined positional frequency (C) of the stripes in the lengthwise direction of the web, and
predetermined positional amplitude (D) of the stripes in the cross-direction of the web.

"Predetermined" is to be understood in the sense that the positional alternating adhesive stripes are designed to provide benefits in view of the larger machine rolls as well as the smaller customer rolls. Thus, the positional alternating is specifically designed to provide benefits both in the machine roll and in the customer rolls.

"Positionally alternating" is further broken here into two main components: positional frequency of the adhesive stripes changing their position in the lengthwise direction of the web and positional amplitude of the stripes in the cross-direction of the web. Together these parameters define how quickly and how much the adhesive stripes change their position along the length of the web.

Said predetermined properties (A, B, C, D) of the positionally alternating continuous adhesive stripes may be selected so that
  number of the stripes in each single customer roll is one or more,
  width of each stripe is smaller than a width of each single customer roll, and
  positional frequency is selected so that one oscillation cycle covers 0.1-10 peripherical lengths in a machine roll, defined as peripheries of the full machine roll, and
  optionally, positional frequency is selected so that one oscillation cycle covers 1-100 peripherical lengths in a customer roll defined as peripheries of the full customer roll.

Thanks to this embodiment, the telescoping problem which may cause challenges to the manufacturing method and decrease production efficiency of the manufacturing process, may be avoided. Moreover, this embodiment may reduce an accumulation of the adhesive coating to a linerless label printer. Said accumulation of the adhesive might result more dusting related problems as dust can be adhered together with the adhesive to the printer and, hence, result shortened printer service cycle. Thus, thanks to this embodiment, dusting related problems may be avoided, or at least diminished.

Number of the positionally alternating adhesive stripes in a customer roll may be one or more than one, preferably equal to or more than 2, more preferably equal to or more than 4, and most preferably equal to or more than 6. The number of adhesive stripes in the customer roll may be used to adjust the overall tackiness of the label and reduce adhesive contamination in the linerless printers. Further a higher number of adhesive stripes provides removability of the label and capability to tack onto uneven surfaces. Further, number of the positionally alternating adhesive stripes in a customer roll may be equal to or less than 15, more preferably equal to or less than 12, and most preferably equal to or less than 10. A larger number of the stripes does not typically provide any further benefits but makes the manufacturing of the label web more complicated. Thus, with a suitable number of adhesive stripes it is possible also to avoid the telescoping problem while obtaining good properties for the customer rolls. Moreover, dusting related problems may be avoided, or at least diminished.

In an embodiment, in order to avoid the telescoping problem of the machine rolls, positional frequency of the adhesive stripe may be selected so that one oscillation cycle covers 0.1-10 peripherical lengths in a machine roll, defined as peripheries of a full roll. Further, in order to avoid the telescoping problem and improve properties of customer rolls, positional frequency of the adhesive stripe may be selected so that one oscillation cycle covers 1-100 peripherical lengths in a customer roll defined as peripheries of full rolls.

Thus, positional frequency of the adhesive stripe may be selected so that one oscillation cycle covers equal to or more than 0.1 peripherical lengths in a machine roll, more preferably equal to or more than 0.4 peripherical lengths in a machine roll, and most preferably equal to or more than 0.8 peripherical lengths in a machine roll, defined as peripheries of the full machine roll. Further, positional frequency of the adhesive stripe may be selected so that one oscillation cycle covers equal to or less than 10 peripherical lengths in a machine roll, more preferably equal to or less than 6 peripherical lengths in a machine roll, and most preferably equal to or less than 3 peripherical lengths in a machine roll, defined as peripheries of the full machine roll. Thus, the telescoping problem of the machine rolls may be avoided. Further, easiness of the manufacturing process having such positional frequency may be improved. Moreover, an accumulation of the adhesive coating to a linerless label printer as well as dusting related problems may be avoided, or at least diminished.

Further, positional frequency of the adhesive stripe may be selected so that one oscillation cycle covers equal to or more than 1 peripherical lengths in a customer roll, more preferably equal to or more than 10 peripherical lengths in a customer roll, and most preferably equal to or more than 30 peripherical lengths in a customer roll, defined as peripheries of the full customer roll. Further, positional frequency of the adhesive stripe can be selected so that one oscillation cycle covers equal to or less than 100 peripherical lengths in a customer roll, more preferably equal to or less than 80 peripherical lengths in a customer roll, and most preferably equal to or less than 60 peripherical lengths in a customer roll, defined as peripheries of the full customer roll. Thus, the telescoping problem of the customer rolls may be avoided. Further, some properties of the customer roll may be improved.

In an embodiment, the step of providing one or more than one positionally alternating adhesive stripe may comprise the following steps:
  applying at least one continuous layer of adhesive,
  removing, in an oscillating manner, at least 50% of the applied adhesive coating prior to drying by using an oscillating actuator in order to provide the one or more than one positionally alternating adhesive stripe and adhesion-free areas.

The oscillating actuator may comprise a blade, which may be used to remove at least some of the applied adhesive.

In an embodiment, the adhesion-free areas may comprise a residual amount of the adhesive coating in a range of 0.5-5.0 g/m$^2$. In addition, or alternatively, a dry weight content of the adhesive coating after being removed from the substrate may be 0.1-5% lower than a dry weight content of the adhesive coating applied onto the substrate. In addition, or alternatively, a dwell time between applying the adhesive coating and removing the adhesive coating may be from 0.05 to 3 seconds.

In an embodiment, the step providing the one or more than one positionally alternating adhesive stripe comprises:
  applying the adhesive coating locally by using an oscillating actuator in order to provide the one or more than one positionally alternating adhesive stripe.

In this embodiment, the oscillating actuator may comprise a nozzle for applying the adhesive.

In an embodiment, the positionally alternating adhesive stripe has a predetermined width of the stripe, a predetermined positional amplitude, and a predetermined positional frequency. The predetermined positional frequency defines a wavelength of the stripe.

In an embodiment, the width of each stripe may be smaller than a width of each single customer roll. The width of each stripe may be smaller than 0.5 times a width of each single customer roll. The width of the stripe may be equal to or less than a width of an adjacent adhesion free area. Still further, width of each stripe may be smaller than width of the smallest single customer roll, obtained from the machine roll. Thus, it is possible to avoid a telescoping problem of linerless label rolls while providing good adhesion level for the pressure sensitive label. A typical width of a linerless customer roll may be around 2 inches, for example 58 millimeters. In such case the adhesive stripes may have 5 mm width separated by 5 mm areas without adhesive. The positional amplitude of the stripes, as explained further below, may be, for example from 15 mm to 25 mm.

Further, the one or more than one positionally alternating adhesive stripe may have the positional amplitude. The positional amplitude is determined in the cross direction CD of the linerless label web. The positional amplitude refers to a height of one wave (from a bottom of the stripe to a top of the stripe), determined in the cross direction CD of the linerless label web. When measuring the positional amplitude, each location of the positionally alternating adhesive stripe can be determined from a center of the adhesive stripe.

The positional amplitude may be selected to be in the range between 0.1 and 1 times the width of each customer roll. The positional amplitude is preferably equal to or more than 0.1 times the width of each customer roll, more preferably equal to or more than 0.2 times the width of each customer roll, and most preferably equal to or more than 0.3 times the width of each customer roll. Further, the positional amplitude is preferably equal to or less than 1 times the width of each customer roll, more preferably equal to or less than 0.8 times the width of each customer roll, and most preferably equal to or less than 0.7 times the width of each customer roll, such as in a range of 0.3 to 0.7 times the width of the customer roll. Thus, each customer roll can have the adhesive coating through the whole length of the web, i.e., whole length of one customer roll has the adhesive coating on its surface. Further, said positional amplitude can help to prevent the telescoping problem by preventing the edges of the adhesive stripes becoming "build up" in the same position on successive layers in the customer roll. The additional technical benefit being that in the linerless printer, the adhesive residue buildup, which may be more pronounced at the edges of the adhesive stripes, is distributed over a wider cross-directional area. Because the non-adhesive stripes also have high affinity regarding the adhesive (for good adhesive anchorage), these areas also tend to clean up the printer internals from any loose adhesive residue. Moreover, thanks to this embodiment, dusting related problems may be diminished.

In this embodiment, total coverage of the adhesive coating may be equal to or less than 50% calculated from the total area of the second side of the face. In addition, the total coverage of the pressure sensitive adhesive coating may be equal to or more than 10%, more preferably equal to or more than 30%, and most preferably equal to or more than 40%, calculated from the total area of the second side of the face. Thus, it is possible to prevent the telescoping problem of the linerless label roll by using said total area of adhesive together with the positionally alternating adhesive stripes.

Thanks to this embodiment, a linerless label web comprising pressure sensitive adhesive coating comprising one or more in a predetermined manner positionally alternating adhesive stripes and adhesion-free areas on the second side of the face can be obtained. This allows the linerless label web to be self-wound into larger machine rolls without suffering from telescoping effect which would significantly complicate or even prevent later unwounding and lengthwise slitting into narrower customer rolls. The invention can further provide significant benefits also for the smaller customer rolls ranging from avoiding telescoping into causing less adhesive contamination in the linerless printers. Moreover, thanks to this embodiment, dusting related problems may be avoided, or at least diminished.

Thus, this embodiment may have one or more of the following advantages:
- Smooth outer surface of the roll both in the machine or customer roll,
- No telescoping in the machine roll,
- No telescoping in the customer roll,
- No adhesive bleeding/oozing, even if there are some adhesives at the edges of the customer roll,
- Dusting related problems may be avoided, or at least diminished,
- Adhesive residue reduction in any parts contacting the web during manufacturing (coating, slitting) or end use (printer),
- Allow to slit any coil widths without specific adjustment, and
- Acrylic water-based adhesive may be environmentally friendly adhesive, which may be used e.g. with food materials. Further, acrylic water-based adhesives may have a longer open time, hence, linerless label (web) comprising water-based acrylic PSA may be removed after some seconds or minutes, if needed The waveforms produced by the predetermined selection of the positional frequency and the positional amplitude of the stripes may range from smoothly varying sinusoidal waveforms into more sharply changing, almost stepwise or sharp stepwise changing waveforms. All of these can however be characterized with having a certain positional main frequency and main amplitude behavior.

Release Coating

The direct thermal linerless label (web) may have a release coating 130 on the first side 111 of the face 110, i.e., top of the face 110, as illustrated in FIG. 1.

The linerless label web 100 with pressure sensitive adhesive 120 on its one side (bottom side) and release coating 130 on its other side (top side) can be self-wound around itself without tendency of blocking the adjacent layers of the label web 100 to each other.

The release coating 130 may be directly on the direct thermal coating. Alternatively, the release coating may be on a top coating 116 of the face.

There are several options in how and when the release coating 130 can be arranged on the first side of the face 110.

According to one embodiment, the release coating 130 is coated and cured on the top of the face 110 before either directly coating and drying the adhesive coating 120, 121 on the bottom of the face 110, or alternatively, before transferring the separately dried adhesive coating 120, 121 on the bottom of the face 110. In other words, in these embodiments a readily release coated face 110 is provided into the process of adding adhesive coating 120, 121 on the opposite side of the face 110. The benefit of these embodiments is that the release coating 130 may be provided as a completely separate step and potentially in completely separate facility.

According to another embodiment, the face 110 is first directly coated and dried to have the adhesive coating 120 on the bottom of the face 110, or alternatively, the separately dried adhesive coating 120 is first provided on the bottom of the face 110. In other words, in these embodiments the face 110 is first provided with the adhesive coating 120, 121 on the bottom of the face 110 and the release coating 130 is added afterwards on the opposite side of the face 110. The benefit of these embodiments is that the release coating 130 is not undergoing any previous processing steps helping to avoid release agent contamination during those steps. On the other hand, in this embodiment, the release coating 130 is preferably added in the same process because otherwise the adhesive coated web might not be self-wound into a roll.

According to still another embodiment, the face 110 is pre-coated with a release coating 130 on the thermally printable top side. Then onto the same side and on top of release coating 130 the adhesive coating 120, 121 is either directly coated and dried, or alternatively, the separately dried adhesive coating 120, 121 is transferred on top of this release coating 130. In these embodiments, when the web is self-wound into a roll the pressure sensitive adhesive coating 120 becomes anchored onto the bottom side of the face 110 which is now without release coating. When unwinding the roll such linerless web has the adhesive coating 120 remaining now on the bottom of face 110 and the release coating 130 remaining on top of the face 110. The benefit of this embodiment is that especially in the direct adhesive coating approach it allows the use of adhesive coating methods normally applicable in label industry. This is because other method of manufacturing linerless label (web) 100, 200 is to coat and dry the pressure adhesive on the release coated liner and only then laminating the liner together with the label face material using this same pressure sensitive adhesive layer.

Thermal printing of the linerless label (web) 100, 200 may be made through the release coating 130.

The release coating 130 may be a silicone-based or non-silicone-based release coating. Preferably, the release coating comprises or consists of silicone-based release coating.

Non-thermally curable release coatings are preferable, for example UV curable silicone, because curing of such layers may not heat the thermally sensitive materials in the thermally direct printable face 110.

The release coating may be UV curable silicon having the benefit of being curable on top of thermal face without heat. PA silicone-based release coating 130 may comprise UV curable silicone, for example UV free radical silicone or cationic UV silicone.

The release coating 130 may comprise one or more layers of release coating 130. Thanks to the release coating, the adhesion may be low enough so that the adhesive layer can be readily released from the face material upon unwinding the linerless label product roll. This effect may be further improved if the adhesive coating layer has the adhesion-free areas 150, and/or if the adhesive coating comprises the silicone additive.

The release coating 130 may further provide a lower friction level against the print head of the on-demand printer and/or against other mechanical components of the on-demand printer minimizing wear of those components and minimizing adhesive residue built up. Thus, in an example, the release layer 130 is used in order to lower friction against the print head of the printer.

Therefore, in an advantageous embodiment, the face 110 may comprise a paper and a direct thermal coating, wherein top side of the face 110 is coated with a silicone-based release coating 130, and the other side of the face 110 is coated with the adhesive layer.

The release coating 130 may be an optional feature. For example, if the adhesive coating 120, 121 comprises silicone additive, the linerless label (web) 100, 200 may be release coating 130 free, if the adhesion of the face 110 is (without the release coating 130) low enough so that the pressure sensitive adhesive can be readily released from the face 110 upon unwinding the linerless label product roll. However, even if the adhesive coating 120, 121 comprises the silicone additive, the release coating layer 130 may be used to further improve the self-woundability of the linerless label.

Linerless Label

A label 200 (also called as a linerless label or a label product) is a piece of material to be applied onto an article. Articles of different shapes and materials may be used together with the labels 200. An article may be a package. Properties and requirements for a label 200 may be different depending on the end use in question as described in Table 1.

A label 200 comprises at least the face 110. A typical way to adhere the label 200 onto an article is by use of the PSA coating 120. Therefore, the adhesive coating 120 comprises pressure sensitive adhesive (PSA). A label 200 comprising pressure sensitive adhesive may be referred to as a pressure sensitive adhesive label. Pressure sensitive adhesive labels may also be referred to as self-adhesive labels.

The labels 200 comprising PSA can be adhered to most surfaces through an adhesive layer without the use of a secondary agent, such as a solvent, or heat to strengthen the bond. In that case, the adhesive is pressure sensitive as such. Alternatively, the adhesive may be activatable in order to be pressure sensitive. The PSA forms a bond when pressure is applied onto the label at ambient temperature (e.g. between 15 and 35° C.) or for cold applications even under freezing temperatures below 0° C., adhering the label to the item to be labelled. Examples of pressure sensitive adhesives include water-based (water-borne) PSAs, solvent based PSAs, and hot-melt PSAs. A label may, alternatively or in addition, comprise other adhesive(s).

There are different kinds of labels in the market. A label may be so-called linerless label 200. The linerless label comprises a face 110 and an adhesive on the face 110. Alternatively, the label may be a so-called shrink label, where heat shrinkable polymeric face material(s) are seamed and rolled on or sleeved around labelled articles and shrunk around the items. Shrinkable labels may comprise additionally some pressure sensitive adhesive(s) or those may be produced completely without pressure sensitive adhesive, or even without seaming adhesive. Further, the label may be an activatable linerless label, wherein the adhesive is activatable to be pressure sensitive, using for example additional heat, moisture or other activation means.

In this application, the pressure sensitive adhesive is water-based acrylic PSA. Said PSA may have inherent pressure sensitivity without need for separate activation before being able to be dispensed onto an article to be labeled. Further, the label can be a linerless label which is attached onto the labelled item primarily via the pressure sensitive adhesive covering at least partially the bottom side of the label. The linerless label (web) of the invention is of the tape-type, in other words it can be self-wound onto itself in a roll without need for additional release liner.

Labels may be used in wide variety of labelling applications and end-use areas, such as labelling of food, home and personal care products, industrial products, pharmaceutical and health care products, beverage and wine bottles, other consumables etc. Labels enable providing information, like product specification, on the labelled product(s). Information, e.g. print of a label, may comprise human-readable information, like image(s), logo(s), text, and/or machine-readable information, like bar code(s), QR (Quick Response) code(s). One important subcategory of labels using direct thermal printable face materials are so-called Variable Information Print (VIP) labels. These labels are at least partly printed just before dispensing them onto the item to be labelled and carry product specific information on that individual item to be labelled. VIP labels are used, for example, in retail weighting scales for fruits, vegetables, meat and other items sold per weight. Other labels which are individually printed per need are different type logistic labels containing shipment or product specific information, bus or train tickets or other tickets etc.

Advantageously, the linerless label (web) 100, 200 comprises the face comprising the base paper, the intermediate layer on the base paper, the direct thermal coating on the intermediate layer, the release coating 130 on the top side 111 of the face and adhesive layer on the bottom side 112 of the face. Thus, an improved direct thermal linerless label may be formed, which may have improved properties.

In an advantageous example, the linerless label (web) consists of
- a paper based direct thermal face,
- a release coating on the first side 111 of the face, and
- a water-based acrylic adhesive on the second side 112 of the face.

Natural fibres may decrease dusting of the product. Thus, in an embodiment, natural fibre content of the linerless label (web) may be at least 65 wt. %, preferably at least 70 wt. %, more preferably at least 72%, and most preferably at least 74 wt. %, a based on the total weight of the linerless label (web).

Linerless Label Web and Linerless Label Roll

FIG. 1a illustrates, by way of an example, an $S_x$, $S_y$-cross-section of a linerless label (web) 100, 200, which may be a linerless label web 100 or a single label 200.

As discussed, the linerless label web 100 refers to structure comprising a continuous face 110 and an adhesive 120 arranged on one side of the face 110. A linerless label web 100 is generally processed by moving over rollers. Between processing stages, the label web 100 may be stored and transported as rolls. From the linerless label web 100, individual labels 200 may be cut.

Width of the linerless label web, before cutting into customer rolls, is typically a multiple of the final customer roll width. The width of the web, before it is cut into customer rolls, may be, for example, from 1 to 3 meters.

Afterwards, the wider web width of the machine roll produced in this manufacturing process may be to be slit into a correct customer roll width, for example having a width of at least 10 mm, preferably from 20 to 100 mm, or from 40 to 100 mm. Quite commonly used widths are between 40-60 millimeters.

The linerless label web 100, after rolled into a roll, may be referred to as a (linerless label) customer product roll, customer roll or product roll. Depending on a diameter of the label roll and thickness of the linerless label material, a single roll may contain, for example, 10-100 meters of label material (i.e., linerless label web 100).

The linerless label (web) 100, 200 may comprise at least one, preferably all properties from a group comprising:
- Face has at least three layers comprising a base layer, an intermediate layer, and a direct thermal coating. The intermediate layer is left in between the base layer and the direct thermal coating. Amount of mineral pigments in the intermediate layer is less than 4 gsm. Thanks to the intermediate layer, a quality of the direct thermal coating may be improved. Further, amount of expensive direct thermal coating may be decreased. The intermediate layer having said mineral content may decrease dusting. This can ensure an increased use life of thermal printers.
- Face with static sensitivity below 100 degrees C., preferably below 95 degrees C. but however above 65 degrees C. This ensures that thermal printing can be performed with reasonably low energy levels and high speed in the thermal printer but at the same time prevents the thermal paper undergoing unwanted activation during manufacturing and logistics.
- Coat weight of adhesive layer 120 is in the range of 15-30 g/m² (dry coat weight) in order ensure both; good anchorage to the thermal paper and good tack to different type of surfaces.
- Adhesive layer 120, 121 comprises acrylic based PSA and optionally a silicone additive. Acrylic based adhesives are more environmentally friendly and also provide more suitable temporal build-up of the final tack helping to reduce contamination of the printer. Still further, acrylic adhesives may have a longer open time, hence, linerless label (web) comprising water-based acrylic PSA may be removed after some seconds or minutes, if needed.
- Dusting related problems may be avoided, or at least diminished.
- Adhesive layer 120, 121 has at least one adhesive area and preferably at least one adhesion-free area. This ensures suitable label behavior per given end use but also helps to reduce the contamination of the printer.

Linerless Label Printers

The general properties of the on-demand compact printers are discussed to clarify the requirements for the label product. In labelling process, the linerless label web 100 gets printed by a printer with variable information and guillotine cutter of the printer cuts the label web 100 to proper label length to be applied to product.

Labelling happens manually or automatically. Challenge in linerless label printers is adhesive and dust accumulations to e.g. guillotine blade resulting shorter printer service cycle. In poorest case adhesive although perfect in application cannot be used as printer service cycle gets too short.

FIG. 2 shows an example of a label printer 240 useable together with a linerless label web 100 according to this disclosure. The label printer 240 may be called as a linerless label printer or linerless printer. These terms refer to a printer that is arranged to print linerless labels. The label printer 240 may be referred to as an on-demand label printer to emphasize that the printer may be used for printing the labels individually per need.

Business environments wherein such on-demand label printers are used typically call for very compact size and ease of use of those printer devices with minimal need for servicing. Thanks to the direct thermal printable linerless labels, the linerless labels themselves carry the thermally sensitive printable coating. This deviates from other non-direct thermal printing methods utilizing, for example, separate thermal print ribbons that need to be loaded into the printers and replaced after use accordingly.

Further, the number of individual components is selected to have minimal complexity. Preferably, the printer is also made very simple to use and has, for example, minimal need for any settings and adjustments.

Main functional parts inside such a compact linerless label printer may comprise: a mechanism for conveying a label web 100 through the printer, a thermal print head for printing the individual labels onto the label web 100 and a mechanism for separating individual labels from the label web 100 and providing them for manual dispensing.

The mechanism for conveying the label web 100 starting from unwinding the web from the label roll through all various parts of the printer and finally outputting the individual labels is typically a series of guidance rolls and guidance surfaces. To minimize both the size and complexity of such a unit, most of the rolls are freely running and perhaps only one or only a few of them are motorized in order to traction the label web 100 forward during printing. These rolls or surfaces may not utilize any special friction lowering coatings for cost effective structure. The traction roll(s) may also comprise simple plastic or rubber roll without any special coating but solely with a surface roughened in order to ensure traction. Typically, a single printer model is also designed to accept different widths of label rolls using a simple adapter to center the roll with respect to the web trajectory. Such a simple yet effective and economical printer design places severe demands on the linerless label web 100 in order to ensure smooth operation in customer service-oriented work. Typical challenges are related to pressure sensitive label web 100 sticking inside the printer to its various components and preventing smooth forward traction of the label web 100, and/or accumulation of adhesive residue onto printer components in prolonged use leading to the aforementioned problems and requiring cleaning of the printer components.

The thermal print head in this type of compact printers is typically selected to use lower print energies, i.e. less thermal energy may be transferred into the thermo-sensitive layers of the linerless label web 100. This is preferable in applications wherein short-lived labels are to be printed in a simple and economical manner. Even if the print heads could be adjusted for higher energy levels or temperatures, it may be preferable to run them on lower settings in order to maximize the use life of the thermal head/printer. It may also be that if the linerless label requires higher activation, the printing speed needs to be lowered due to the performance limitations of the printer.

In order to print, the thermo-sensitive linerless label web 100 may be tractioned via a gap between the thermal head and a platen roller. The printer sends an electric current to the heating elements of the thermal head, which generate heat. The heat activates the thermo-sensitive coloring layer of the thermosensitive paper, which changes color to black where heated. Such a printing mechanism is known as a thermal printing system or direct thermal printing system. The heating elements are usually arranged as a line of small closely spaced dots. The printing energy (temperature and/or exposure time) may be adjustable, but such adjustments tend to be tedious and preferably a direct thermal printable label material should be selected in order to work without a need to fine tune the printer properties. If more printing energy is required, this typically means that the printing speed is slowed down allowing the printing temperature to affect the label for longer time and therefore transferring more energy to the web. Therefore, the performance of the print head has an effect on selection of the thermal face material of the linerless label product in order to ensure good quality printing even with lower print energy/heat levels and higher printing speed.

The mechanism arranged in the output side of the printer for separating individual printed labels from the continuous linerless label web 100 may comprise various types of electrically motorized cutting blades or guillotines or in many cases just simple non-movable serrated cutting blades. The latter requires the user to manually tear the label web 100 against the serrated or toothed blade. In any case, the user needs to manually grasp the printed label that has been offered out from the printer. When using a non-motorized or non-assisted cutting mechanism, the user needs to grip the label rather firmly to manually separate it from the continuous web. This again places requirements for the label material so that it will not unnecessarily stick to the cutting mechanism of the printer or the fingers of the user who needs to be able to conveniently position the label into its first labelling position.

In view of being used in such printers, the linerless label (web) 100, 200 according to the invention uses water-based acrylic adhesive. Water-based acrylic adhesive provides less aggressive first tack meaning that after being opened from the label roll, the immediate tack of the PSA when guided through the printer is less aggressive compared, for example to hot melt-based PSAs. This helps, together with other features of the label, to minimize the adhesive residue build up inside the printer. The final tack builds up only after the label has been dispensed and left on the labelled item for a longer time. The label might even be removable over a certain period of time (minutes), before building a more permanent type of tack. Specific properties of PSA naturally depending on the exact formulation of the adhesive and surface materials to be labelled.

A linerless label product disclosed herein may be intended for end uses having a short label-life and requiring manual handling, repositionability and/or removability together with lean sustainable and economical structure.

For example, in fast food restaurants, as specific end use, the meal order may be first made either remotely via internet or locally in the restaurant via self-service touch-screen order kiosk or at the service desk. After the order and sales have been confirmed then one or more labels may be printed for the order. For example, at the drink station one or more labels may be printed for the drinks and attached onto the appropriate cups. In the kitchen, one or more labels may be printed for the various parts of the meal, for example for different burgers and other dishes or side-dishes. After the various dishes have been prepared and individually boxed or wrapped, then the appropriate labels may be individually attached to each of the dishes. If applicable and especially for a larger order, a compilation or summary label may also be printed and used to help to compile and check that all dishes included in the order have been prepared and included before delivering the order to the customer.

For another example, a luggage tag may be a label which is wrapped around the handle of a luggage, in this case typically around the handle of a takeaway or delivery bag. The luggage tag label adheres onto itself as loop around the handle leaving the sticky adhesive side facing inwards and printed side facing outwards. In a takeaway or delivery bag such a luggage tag can be thus used both as a sealing label as well as identification label during the transport or for the end user.

The linerless label according to the specification can be particularly suitable for using with on-demand linerless label printer. Thus, it may reduce the problems caused by the through cutting of said printers. i.e., linerless label to be cut by a blade of a linerless label printer. The novel solution may prevent an accumulation of the adhesive coating 120 to a blade of the linerless label printer, which may result shortened printer service cycle. Thanks to the novel solution wherein the adhesive coating layer comprises silicone additive, adhesive accumulation to the blade of the printer may be significantly reduced. Further, adhesive accumulation to platen roll and other parts of the linerless label printer may be significantly reduced.

Thus, there are multitude of requirements placed on the linerless label product in order to provide cost-efficient, efficient, and trouble-free operation in a user friendly and sustainable manner.

Manufacturing Methods

A method for manufacturing a direct thermal linerless label web 100 comprising a face 110 having a multilayer structure comprising at least three layers may comprise the following steps:
- supplying the face 110,
- applying a water-based acrylic adhesive coating 121, and
- thermally drying the adhesive coating 121 into a pressure sensitive adhesive coating 120, wherein
1) the adhesive coating is applied on to the face 110, or
2) the adhesive coating is applied on to a carrier material 611, and the method further comprises: transferring the pressure sensitive adhesive coating 120 from the carrier material on to the face 110, wherein the face comprises:
- an uncoated base layer,
- a direct thermal printable coating,
- an intermediate layer left in between the base layer and the direct thermal printable coating, and
- optionally, a top coating on the direct thermal printable coating, wherein
  - the intermediate layer has a grammage in a range between 1 g/m² and 7 g/m²,
  - a total amount of mineral pigments in the intermediate layer is equal to or less than 4 g/m², preferably equal to or less than 3 g/m² and
  - the mineral pigment content of the intermediate layer is equal to or less than 85 wt. %, preferably equal to or less than 80 wt. %, more preferably equal to or less than 75 wt. %, and more preferably equal to or less than 70 wt. %, calculated from total dry weight of the intermediate layer.

Machine speed of the process may be, for example, 100-600 m/min.

Figure 3:
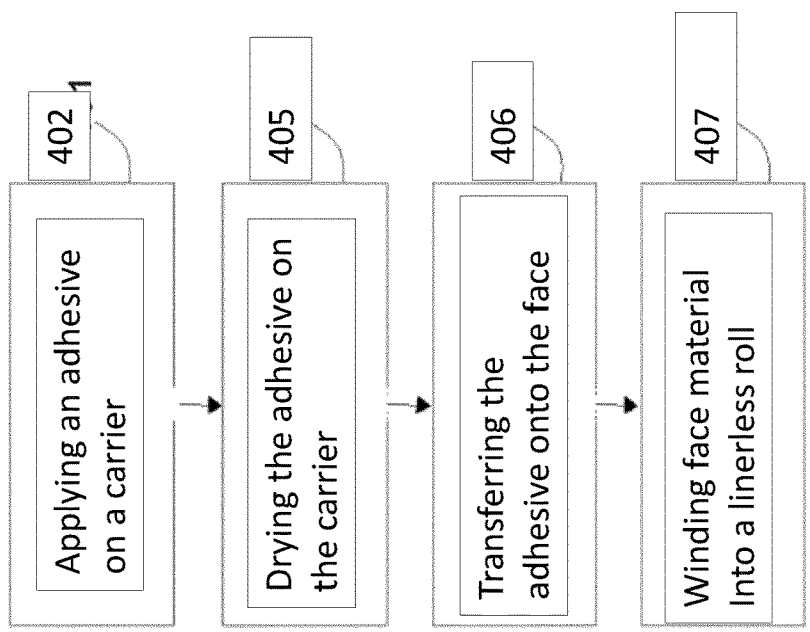
FIG. 3 illustrates, by way of an example, method steps according to an embodiment.

FIG. 3 illustrates a method according to an embodiment. This method allows applying a PSA on a sensitive linerless face and forming a linerless label web 100 without exposing the face 110 to temperatures exceeding the activation temperature of the direct thermal coating material(s). Steps 402, 405, 406, 407 may also be called phases or stages.

Figure 4:
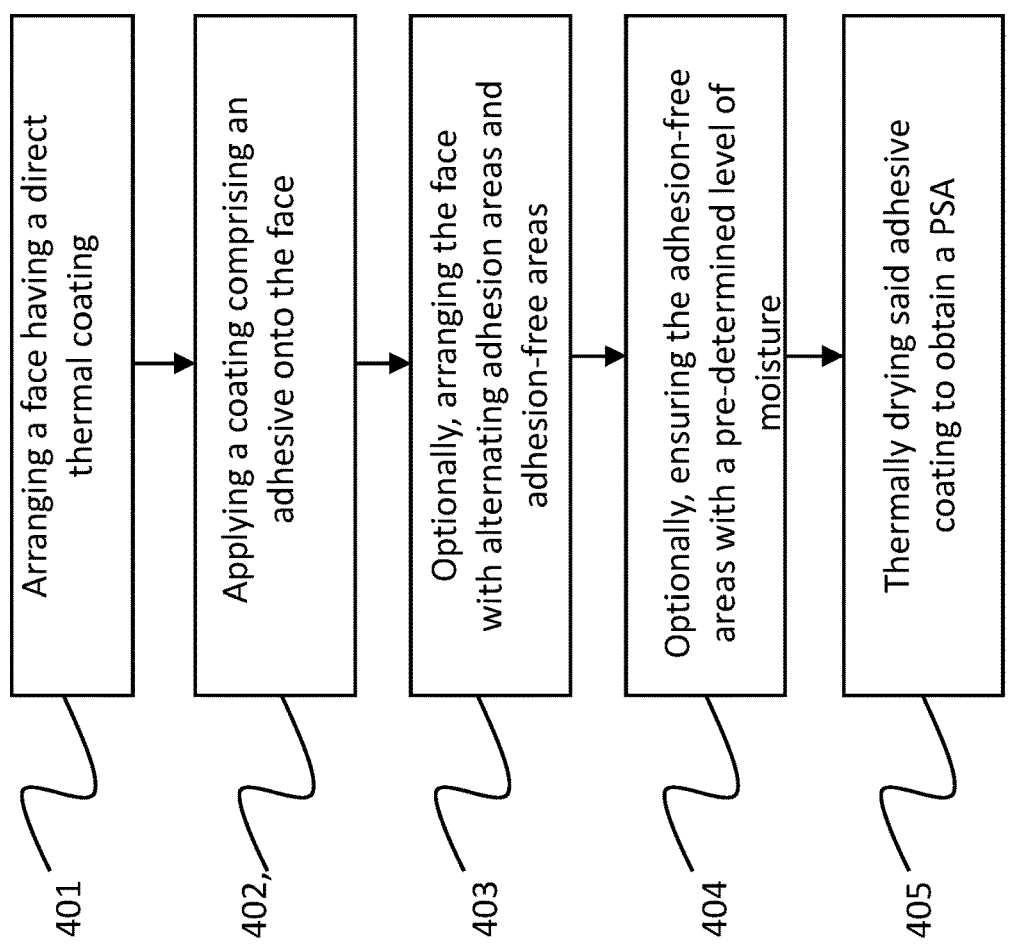
FIG. 4 illustrates, by way of an example, method steps according to an embodiment.

According to an embodiment illustrated in FIG. 4, a method for manufacturing a linerless label web 100 comprising a direct thermal printable coating and a pressure sensitive adhesive is provided. The method may comprise
- arranging a face comprising direct thermal printable coating (step 401),
- applying adhesive coating 121 onto the face (step 402),
- optionally, providing the face with alternating adhesion areas and adhesion-free areas (step 403), optionally, ensuring the adhesion-free areas 150 with a predetermined level of moisture (step 404), and
- thermally drying the adhesive coating 121 into the pressure sensitive adhesive 120 (step 405).

Steps 402-404 of the method may be performed simultaneously or stepwise. Step 404 may also refer to maintaining or arranging the adhesion-free areas 150 with moisture.

An Example of an Adhesive Coating Step

A coating unit 580 can be arranged for applying adhesive coating 121 onto a face 110. The adhesive coating 121 may be applied onto the face 110 using a contact coating method, such as a roll coating, or curtain coating, foam coating or spray coating. The adhesive coating 121 may be applied by a direct gravure coating.

Alternatively, the coating unit 580 can be arranged to apply the adhesive 121 onto a carrier material. The coating step may comprise a contact coating method, such as a roll coating, or curtain coating, foam coating or spray coating.

As discussed, the adhesive coating 120, 121 may or may not be patterned. Patterned adhesive refers to a situation wherein the adhesive covers less than 100% of the second side 112 of the face surface. For example, the adhesive may cover between 10% and 90% of the total area of the face 110. The adhesive may be arranged for example as stripes along longitudinal direction (i.e. the first direction) of the label web 100. Alternatively, the adhesive may be arranged, for example, as spots or other similar noncontinuous areas. Thanks to these solution, contamination of the printer parts by the adhesive may be avoided or at least diminished. Further, from the economic and environmental point of view it is favorable to provide the label web 100, 200 with the adhesive solely on parts of the label necessary for providing the desired adhesion.

Thus, the adhesive layer may be a continuous layer, or the adhesive layer may be a non-continuous layer having
- adhesive areas, such as adhesive spots and/or adhesive stripes, and/or other kinds of adhesive areas, and
- adhesion-free areas.

In an embodiment, the patterned adhesive is provided by first applying the adhesive coating 121 onto 100% area of the face 110 by the coating unit 580. After that some of the adhesive coating 121 is removed from the face 110 so as to provide the face 110 with alternating adhesion areas and adhesion-free areas 150 in the transversal direction of the face 110. Removing of the adhesive is performed before drying the adhesive in at least one drying unit 560. Removing of the adhesive may be performed by a unit 590.

Applying the adhesive coating 121 onto 100% area of the face 110 provides the effect that also the areas wherefrom the adhesive is removed later on, will get moistened by the water contained by the adhesive. Thus, there may not be a need to arrange moisture separately onto the adhesion-free areas 150 of the face 110. When applying adhesive coating 121 onto full area of the face 110, water is absorbed into the face 110 and small amount of adhesive is remaining on the face 110 after pattern gumming, also on the areas wherefrom the adhesive has been removed. The residual amount of the adhesive is anyway so small, that after drying it does not provide significant adhesion properties, and thus is called adhesion-free.

The adhesive may be removed from the face by a blade, such as a nylon blade. The blade may be called a pattern gumming blade or a doctor blade. The blade may refer to any means suitable for removing adhesive from a web. The blade has the effect that while removing the adhesive, the blade simultaneously provides pressure to the face 110, thus pushing moisture, i.e. water contained by the adhesive into the face 110.

It should be noted that a certain coating thickness (coat weight) is needed in order to obtain the water-based PSA as a uniform, defect free layer on the face 110. Simply lowering the adhesive coating thickness under a certain value in an effort to facilitate drying at lower temperatures and without increasing the drying time can lead to unsatisfied PSA quality and performance. Therefore, the disclosure herein may also aim to provide means for using high enough coating thickness (coat weight) together with high enough drying temperatures in order to achieve good PSA quality and performance but yet to prevent overheating of the thermally sensitive coating.

FIG. 6 provides a detailed view of the method and the apparatus according to an embodiment. The adhesive coating 121 is applied onto 100% area of the face 110 by the coating unit 580. After that, some of the adhesive coating 121 is removed from the face 110 so as to provide the face 110 with alternating adhesion areas and adhesion-free areas 150 in the transversal direction of the face 110. A unit 690 is arranged to remove the adhesive coating 121 in order to provide the face 110 with adhesive stripes visualized as black blocks 121 in dashed enlargement of FIG. 6. Grey droplets of FIG. 6 illustrate the adhesive coating removed from the face 110. Adhesive removed from the face 110 may be collected and returned back to the coating unit, as illustrated by the curved arrow between the unit 690 and the coating unit 580.

Alternatively, the patterned adhesive, if used, may be provided applying the adhesive coating 121 only locally onto the face 110 so as to provide the face 110 with alternating adhesion areas 121 and adhesion-free areas 150 in the transversal direction of the face 110. This is illustrated in FIG. 7. The adhesion areas, i.e. the adhesive 121 stripes, are visualized as black blocks in FIG. 7. In order to prevent activation of the thermal paper while drying the adhesive, moisture may be provided onto the adhesion-free areas 150 of the face 110 prior to drying of the adhesive coating 121 into the pressure sensitive adhesive 120. Moisture may be provided by a unit 590, the unit 590 in this case being e.g. a water sprayer. The water sprayer can be arranged to provide a water spray solely on the adhesion-free areas 150 as illustrated by the grey, broad arrows in FIG. 7.

Figure 5:
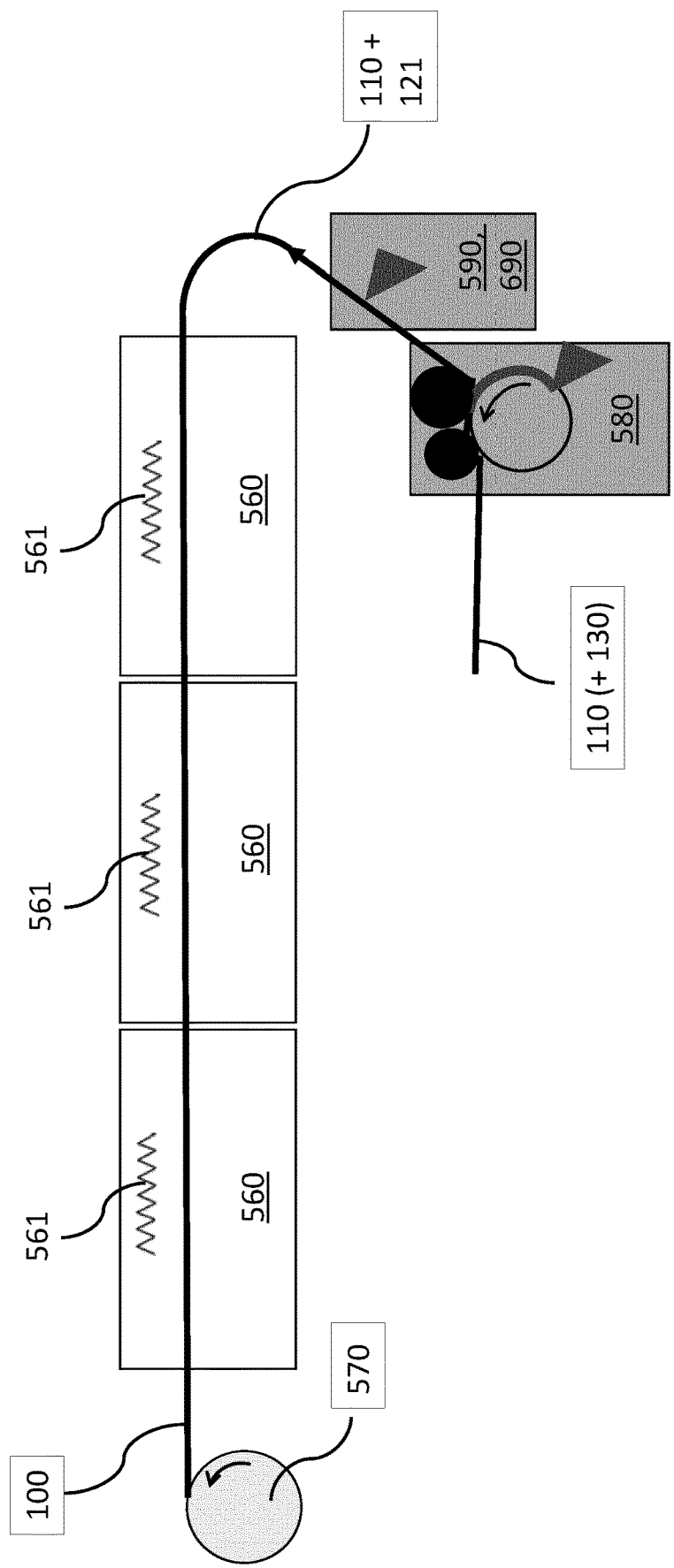
FIG. 5 illustrates, by way of an example, an embodiment of a manufacturing method and an apparatus.

Therefore, downstream of the coating unit 580 the apparatus may comprise a unit 590 for adhesive removal, and/or a moisturizing unit 690 as shown in FIG. 5.

Ensuring the adhesion-free areas 150 (shown e.g. in FIG. 7) with a predetermined level of moisture has the effect that when drying the adhesive the moisture will evaporate, which evaporation prevents temperature of the thermal paper from increasing to values that would cause activation of the thermal paper.

An Example of a Drying Step

The adhesive coating 121 may be dried in at least one drying unit 560.

One problem with the face 110 comprising thermal paper arises from heat sensitivity of the thermal paper. Thermal coating of a thermal paper is activated using heat. This may prevent drying and/or heating water-based adhesive on a thermal paper, since heating may lead to activation and the thermal paper becoming blackish or causing less severe but unwanted visual changes. The partly or fully activated brownish or blackish thermal paper surface prevents providing a high-quality visible print on it.

Further problems may arise when only a part of the face 110 comprising the direct thermal paper is arranged to comprise the adhesive, thus leaving certain areas of the face 110 without adhesive. Those areas without the adhesive would be even more prone to activation of the thermal paper while drying and/or heating the adhesive. Some label applications call for such patterned adhesive sometimes also referred as pattern gumming.

Direct thermal printable coating of the label face substrate has traditionally prevented utilizing water-based adhesives with linerless labels. Such adhesives are typically dried in order to evaporate water after the adhesive has been applied onto a face 110 of a label. Use of water-based adhesive necessitates drying, while any heat sensitive layer or part of a label may prohibit drying or heating close or above the activation temperature of the heat sensitive layer. Drying with lower temperatures and lower coat weight (i.e. with less mass to be dried) may be possible, but without very careful selection of drying process parameters would in turn cause at least ineffectiveness and longer drying times and/or dimensions (length) of the drying chamber or oven.

A low coat weight may have a negative effect on PSA adhesion on labelled surface. Especially, if good adhesion and at the same time removability and/or repositionability is required, these call for higher coat weight of the PSA and this is especially emphasized in case of water-based adhesives. Further, if the adhesive is to be dried at lower temperatures because of the sensitive thermal coating extra care needs to be taken that the adhesive becomes fully dried and achieves optimal pressure sensitive adhesion performance.

The apparatus can comprise at least one drying unit 560 for drying the adhesive coating 121. The drying unit can comprise at least one drying device 561.

The adhesive coating 121 may be dried on the face 110 or on the carrier 611. As a result of the drying, the pressure sensitive adhesive 120 is obtained.

The adhesive 121 is dried in order to evaporate water from the water-based adhesive. Drying comprises heating. Heating may be implemented by at least one of the following: infrared heating, microwave heating or air blow. Preferably the adhesive 121 is dried by air blow or by air blow together with another type of drying. Another type of drying may comprise infrared energy and/or microwave energy. This ensures suitable level of pre-heating of the adhesive to start the evaporation of the moisture from the adhesive but preventing the skinning of the adhesive top surface that would block the moisture from escaping out deeper from the adhesive layer.

The drying phase of the machine comprising the drying unit(s) may have a total length of between 20 and 30 meters.

If the adhesive coating 121 is dried on the face 110, the drying unit 560 may have a temperature of between 60 and 90 degrees C. or in some cases even higher up to and above 100 degrees C. Preferably the drying temperature is at least 75 degrees C. in order to ensure that the water-based adhesive becomes fully dried and provides maximum adhesive performance such as adhesion. The face 110 comprising the adhesive coating 121 thereon may be arranged to proceed through the drying unit 560. Thus, a linerless label web 100 is formed.

Temperature of the linerless label web 100 when exiting thermal drying may be arranged to be from 5 to 15 degrees C. below an activation temperature of the direct thermal printable coating. From economical point of view, it may be preferable to arrange the temperature of the linerless label web 100 when exiting thermal drying to be as close to the activation temperature of the direct thermal printable coating as possible.

After drying of the adhesive, the face 110 with the pressure sensitive adhesive thereon, i.e. the linerless label web 100 can be wound onto a roll 570 of linerless label web 100.

According to an embodiment, the adhesive for the linerless label web is dried separately on a carrier material 611, before attaching the adhesive onto a face of the label. This avoids problems arising from heat sensitivity and enables usage of environmentally friendly water-based adhesives in such linerless labels. This approach allows a wider selection of substrate materials for the labels including substrate or coating materials even with lower physical or chemical performance but still fully valid for on-demand linerless printing and short-lived label applications. It should be understood that such label products do not need to be designed for the normal converting steps (printing, die-cutting, perforating, potential waste matrix removal etc.), but can be after manufacturing and slitting into customer rolls simply printed and manually dispensed for their final use. For such use, even lower grade and more economical materials can be used as the adhesive is separately dried using a separate carrier material 611, such as a metal belt or a web.

Water-based adhesive is used in the following embodiments. A solvent based adhesive or a hot melt adhesive would require some changes in the details of the adhesive coating techniques when the adhesive is first applied onto a carrier used for drying/curing the adhesive. Further, use of other adhesive types to achieve PSA might cause some changes in the drying and/or curing of the adhesive on the carrier material. However, the PSA of this specification is water-based adhesive for reasons discussed in this specification.

In this embodiment, the adhesive coating 121 is in the first step 402 applied on a carrier material 611. Then, in the second step 405, the adhesive coating 121 is dried/cured into PSA 120 on the carrier material 611 by conveying the carrier through a drier. The dried water-based adhesive 120 is transferred onto a face 110 of a label web 100 in the third step 406. Finally, the face with the pressure sensitive adhesive is wound into a roll of a linerless label web 100 in the fourth step 407. In this embodiment, the drying/curing of the adhesive coating 121 takes place on a separate carrier material 611 and therefore the thermally sensitive coating(s) of the face are not exposed to temperatures exceeding the activation temperature of said thermally sensitive coating.

Figure 8:
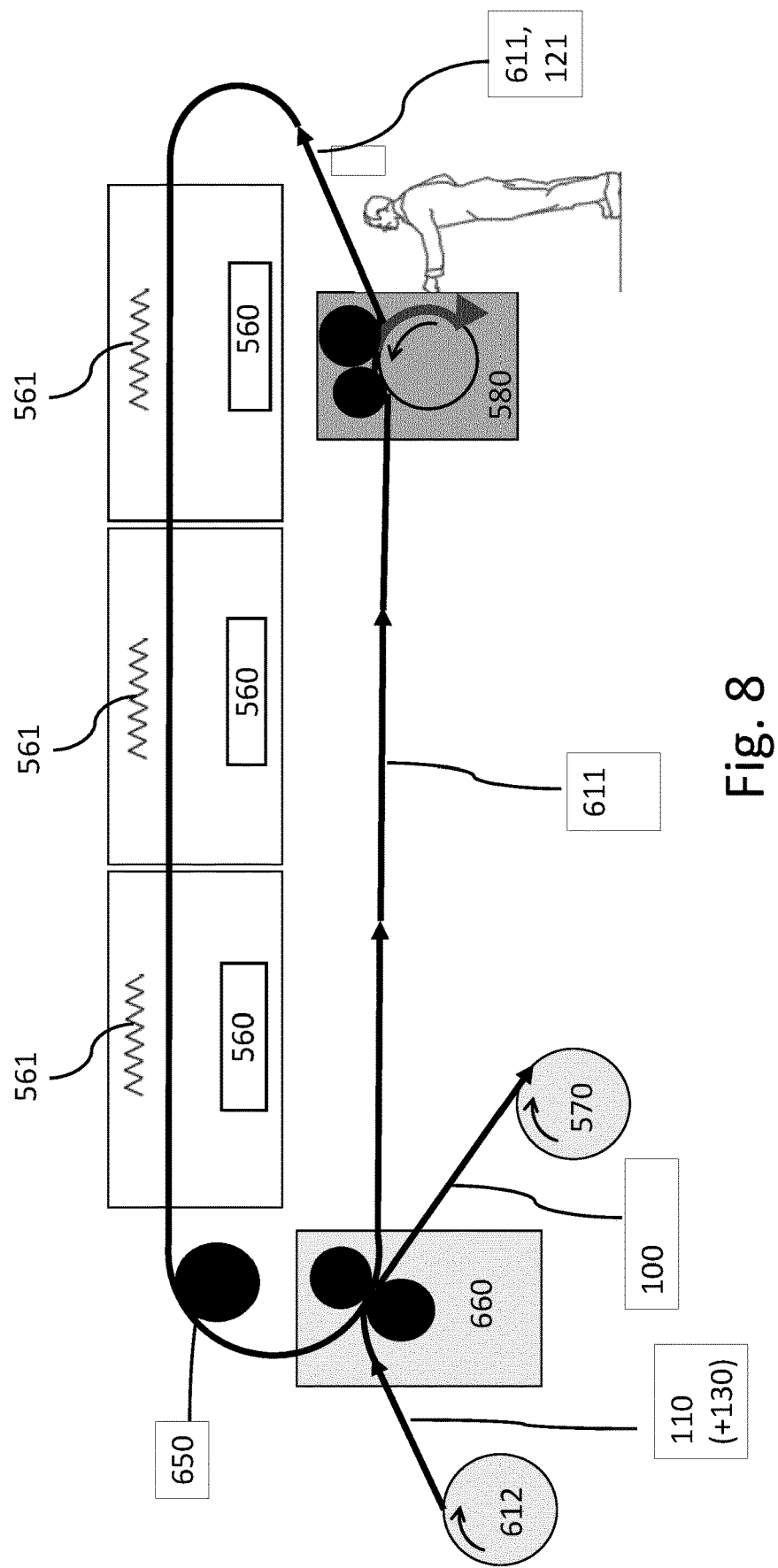
FIG. 8 illustrates, by way of an example, an embodiment of a manufacturing method and an apparatus.
Figure 9:
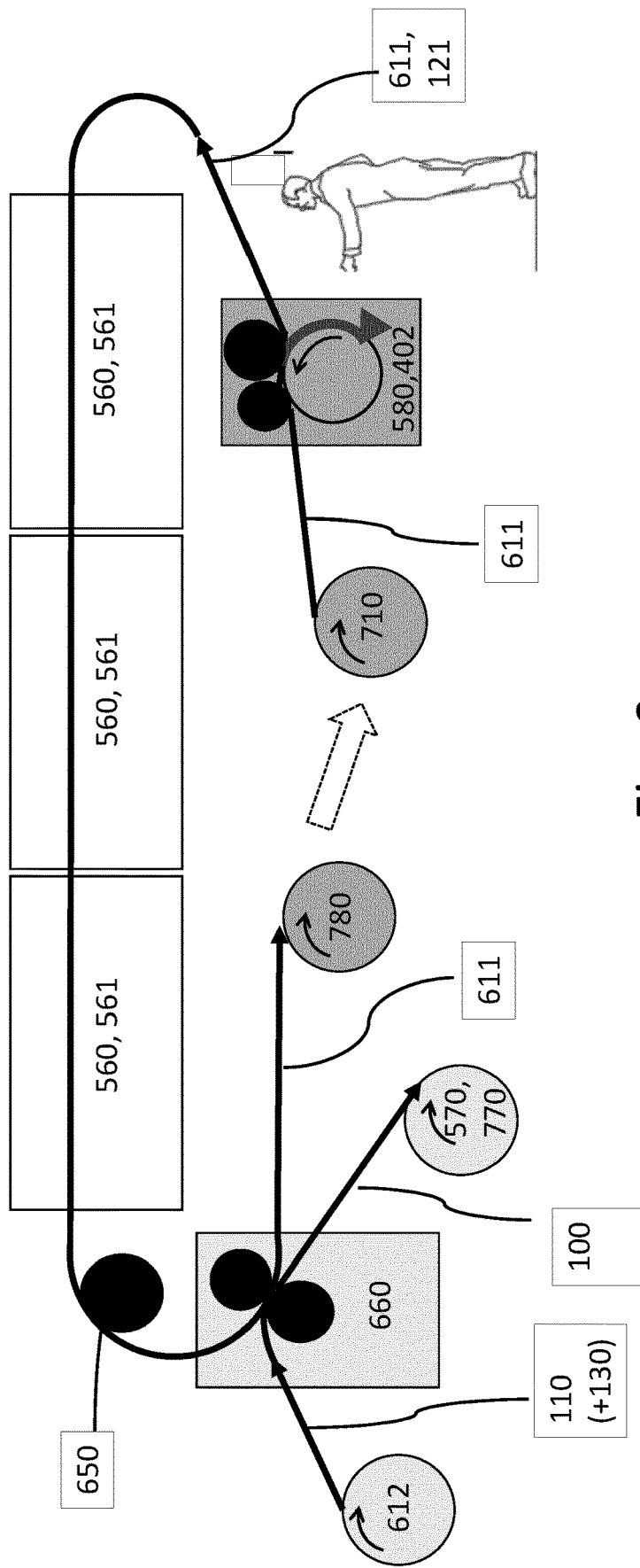
FIG. 9 illustrates, by way of an example, an embodiment of a manufacturing method and an apparatus.

Two example approaches for the manufacturing method using a carrier material are illustrated in FIGS. 8 and 9. The main difference between these two methods is how the carrier material 611 used for drying the adhesive coating is arranged. According to an embodiment schematically described in FIG. 8, the carrier material is arranged to be an endless belt. According to another embodiment schematically described in FIG. 9, the carrier material is arranged to be a reusable batch of a web material.

Drying may be implemented by one or more drying device(s) 560, 561. The adhesive coating 121 may be dried on one or both sides of the carrier, i.e. above and/or under the carrier. The adhesive coating 121 may be dried directly and/or indirectly. Drying temperature of the water-based adhesive on a belt may be at least 75 degrees C., preferably at least 80-85 degrees C. to ensure that the water-based adhesive becomes fully dried and provides maximum adhesive performance such as adhesion. It should be understood that all heating/drying/curing methods explained earlier are also applicable herein if they are suitable for the carrier selected to be used.

If the carrier material 611 is used, the dried adhesive coating 120 is applied onto a face 110. The label web comprising the face 110 and the adhesive can be wound up onto a roll 570 with a winder 770.

The apparatus may comprise an unwinder 612 for the face 110. The face 110 may be in form of a web wound to a roll. The face 110 may be unwound from the roll. After dried, the adhesive 120 may be attached to the face 110. The unwound face 110 and the dried water-based adhesive on the belt 611 can be attached in a nip 660, thereby forming a linerless label web 100. The formed linerless label web 100 can be wound up to a roll 570.

The apparatus may further comprise a cooling cylinder 650. The cooling cylinder may be situated before the point wherein the dried water based adhesive layer is attached to the face 110. Speeds of the rolls in the apparatus of the FIG. 10 may be substantially the same in order to avoid damaging the face 110, for example tearing of a paper face 110. Speed difference between the rolls of the apparatus is preferably less than 0.5%.

The carrier material 611, if used, may be a belt, for example a silicone belt, a plastic belt, such as a nylon belt, or a metal belt, such as a steel belt. Alternatively, the carrier material 611 may be a batch of a web material. The carrier material 611 may be a filmic web material, preferably a polyethylene terephthalate (PET) web or other thin filmic material tolerating the drying temperatures. For the purpose of this specification, the terms "carrier" and "carrier material" may refer either to an endless belt or to a batch of a web material.

The reusable batch of a web material allows to run predetermined lengths of production as batches and reuse the carrier material several times. The benefits of this approach include, but are not limited to, possibility to use existing liner materials, for example siliconized PET liner as carrier. The carrier 611 may be unwound at carrier unwinder 710 and guided to an adhesive coating station 580. The carrier is preferably a pre-siliconized carrier. The used carrier material 611 wherefrom the PSA 120 has been removed is guided to a carrier rewinder 780. The carrier material is reusable and may be transferred back to unwinder 710 for reuse. Because the typical length of the linerless label web in customer rolls may be 20-100 meters, for example 40 meters, this makes the use of reusable carrier 611 for adhesive preparation viable.

The formed linerless label web 100 is arranged to be rolled onto a linerless label web roll 570.

Later the wider web width of the machine roll produced in this manufacturing process is to be slit into a correct customer roll width, for example having a width of 20-100 mm.

The label web roll 570 may be stored and/or transported for later processing.

Label web roll 570 may be further processed in other location.

Thanks to the present invention, many advantages may be obtained. For example, at least some of the following advantages may be obtained:

1) Water-based acrylic PSA together with the intermediate layer may reduce dusting problems in on-demand printers.
2) Water-based acrylic PSA together with silicone additive may provide further benefits, such as better sustainability with less fossil based raw materials and less volatiles involved both during the manufacturing and during end use.
3) Reliable adhesion/tackiness of the adhesive may be obtained for all of those different types of surfaces onto which the label will be manually dispensed or applied, e.g. during the preparation of the order (for example in the kitchen) or when labelling the various items of the order (for example cups, boxes, wraps, bags, or other packages).
4) Easy repositionability may be obtained so that the label is first applied onto a first surface and then repositioned onto another surface. For example, label may be used first in the kitchen as a note and then labelled onto the ready-made dish.

5) Easy removability may be obtained, for example for customers removing the label used as a closure or seal for a package.
6) Permanent final tack of the label may be achieved in applications where lower first tack is beneficial to reduce adhesive build up in the printer but permanent type of tack of label is preferred after dispensing on the item to be labelled.
7) Suitable chemistry either for direct or indirect food contact may be obtained.
8) Sustainability supporting the short life of such labels may be obtained, i.e. chemistry which does not create undue burden to the environment or call for any special waste management procedures compared to other waste that becomes generated in the processes and activities where such labels are used.

This invention particularly relates to a linerless label to be cut by a blade of linerless label printer. With conventional linerless labels, dust and adhesive can start soon to accumulate to a blade of the linerless label printer, resulting shorted printer service cycle. Sometimes, a linerless label having otherwise perfect adhesive may not be used at all because a printer service cycle would get too short. Thanks to the novel invention, dust and adhesive accumulation to the blade, platen roll and other parts of the linerless label printer may be significantly reduced. The effect of the novel solution can be improved by using silicone additive in the adhesive. Thanks to the novel solution, dusting of direct thermal linerless labels may be substantially decreased.

Experimental Tests

Example 1

Adhesive coatings comprising silicone additive were formed by mixing silicone emulsion to acrylic water-based adhesive. The adhesive coatings comprised emulsified silicone additive and water-based acrylic adhesive. The total amount of the silicone additive in the adhesive coatings varied between 0% and 6%, calculated from the total dry weight of the adhesive coating layer.

According to the test results, 1 wt. % emulsified silicone additive in the adhesive modified the adhesive performance. The best results were found when the amount of the emulsified silicone additive exceeded 2 wt. %. For cost reasons, the content of silicone was kept between 1 wt. % and 6 wt. %, i.e., the maximum amount of silicone was 6 wt. %.

According to the test results, the linerless label comprising the emulsified silicone additive had significantly better properties than same products without the emulsified silicone additive. Without the emulsified silicone additive, linerless label printer was able to cut the linerless label approximately 100000 times (i.e., 100000 cuts) before the printer needs a service. With the adhesive coating comprising acrylic water-based adhesive and emulsified silicone additive, the linerless label printer was able to cut the linerless label from 300 000 to 500 000 times, before the printer needed a service.

The amount of the cuts depended on the amount of silicone additive so that the best results were achieved when the amount of the silicone additive was between 2 wt. % and 6 wt. %, calculated from the total dry weight of the adhesive coating. Further, the label comprising the adhesive coating comprising the silicone additive was each time firmly attached to the surface of the labeled product.

Example 2

Novel linerless label webs were prepared and compared with standard linerless label webs in the market.

General functionality of direct thermal linerless label webs on printers, including direct thermal printability, guillotine slitting, and label dispensing of direct thermal linerless labels on printers (e.g. Bizerba SC II 100), were tested during experimental tests.

Test results confirmed that the novel linerless label webs had at least the same general functionality as the standard linerless label webs in the market. Further, significant differences in dusting tendency of the direct thermal linerless label webs were found between the standard market materials and the novel product.

Figure 11B:
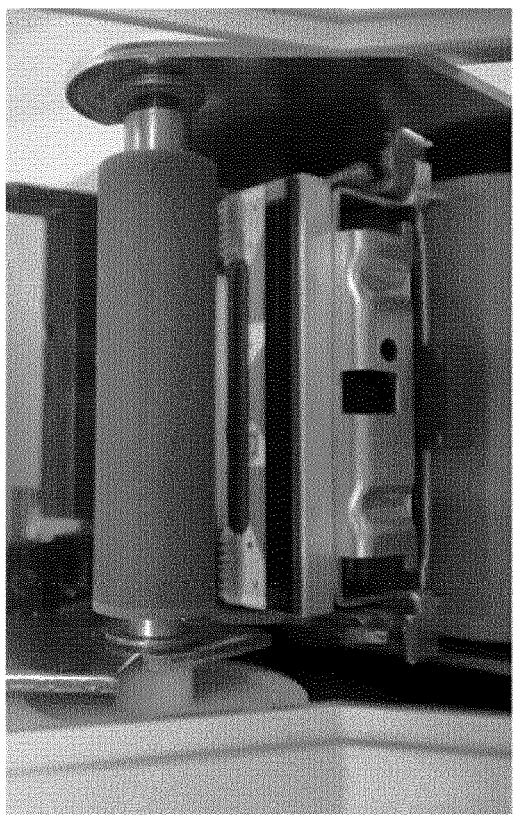
Figure 11A:
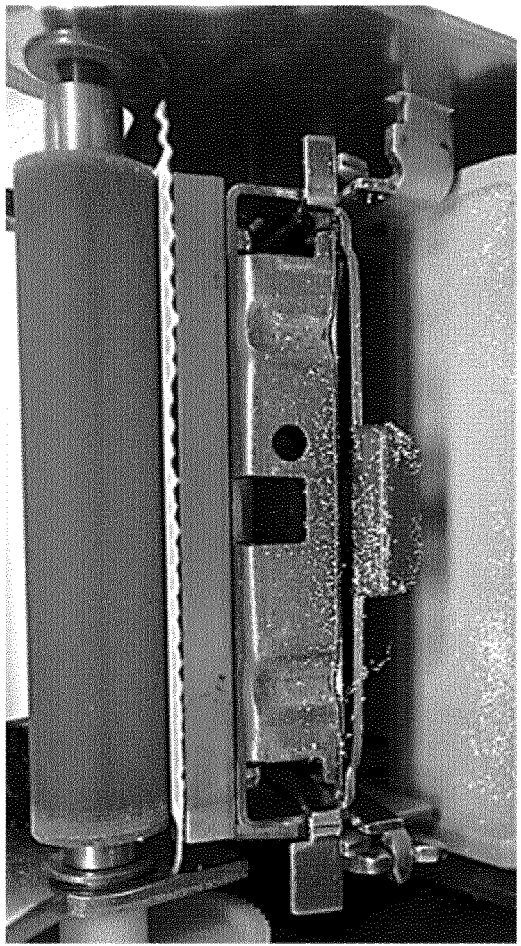

Differences in dusting tendency were clearly seen after a short printing period including printing and cutting of 600 labels. This can be seen in FIGS. 11a-b showing dusting accumulation on direct thermal printers. FIG. 11a shows a photo after a printing test of a standard market material. FIG. 11b shows a photo after a printing test of the novel product. As can be seen, thanks to the novel product, accumulation of the dust to direct thermal printers was prevented or at least substantially diminished.

The invention is not limited solely to the examples presented in Figures and the above description, but it may be modified within the scope of the appended claims.

The invention claimed is:

1. A method for manufacturing a direct thermal linerless label web, the direct thermal linerless label web comprising a face having a multilayer structure comprising at least three layers, the face comprising
   a base layer,
   a direct thermal printable coating, and
   an intermediate layer disposed between the base layer and the direct thermal printable coating,
   wherein
   the intermediate layer has a grammage in a range between 0.9 g/m$^2$ and 7 g/m$^2$,
   the intermediate layer comprises
     a binder, and
     at least one pigment selected from a group consisting of a mineral pigment and a non-mineral pigment,
   total amount of the mineral pigments in the intermediate layer is between 0 and 4 g/m$^2$, and
   a mineral pigment content of the intermediate layer is between 0 wt. % and less than 85 wt. %, calculated from total dry weight of the intermediate layer,
   a total mineral content of the direct thermal linerless label web is in a range between 0 and 20 wt. %, calculated from total dry weight of the direct thermal linerless label web, and
   wherein the method comprises
   supplying the face,
   applying a water-based acrylic adhesive coating, and
   thermally drying the adhesive coating into a pressure sensitive adhesive coating, wherein
   the water-based acrylic adhesive coating is applied on to the face, or
   the water-based acrylic adhesive coating is applied on to a carrier material, and the method further comprises:
   transferring the pressure sensitive adhesive coating from the carrier material on to the face.

2. The method according to claim 1, wherein the base layer is an uncoated base paper having
a grammage in a range between 38 g/m² and 82 g/m², and/or
a mineral pigment content of equal to or less than 18 wt. %.

3. The method according to claim 1, wherein the adhesive coating comprises
an emulsified silicone additive, the amount of the emulsified silicone additive being in a range between 1 wt. % and 6 wt. %, calculated from the total dry weight of the adhesive coating.

4. The method according to claim 1, wherein the intermediate layer has a grammage in a range between 1 g/m² and 5 g/m².

5. The method according to claim 1, wherein the total amount of mineral pigments in the intermediate layer is equal to or less than 2 g/m².

6. The method according to claim 1, wherein the mineral pigment content of the intermediate layer is equal to or less than 60 wt. %, calculated from total dry weight of the intermediate layer.

7. The method according to claim 1, wherein a binder content of the intermediate layer is equal to or more than 20 wt. %, calculated from total dry weight of the intermediate layer.

8. The method according to claim 1, wherein the adhesive coating has a coat weight in a range between 10 g/m² and 25 g/m², calculated as total dry weight of the adhesive coating.

9. The method according to claim 1, wherein the pressure sensitive adhesive coating is on a second side of the face and a total coverage of the adhesive coating is in a range between 10% and 90%, calculated from the total area of the second side.

10. The method according to claim 1, wherein the direct thermal printable coating has a grammage in a range between 1 g/m² and 5 g/m².

11. The method according to claim 1, wherein the face further comprises a top coating on the direct thermal printable coating, wherein the top coating has a grammage in a range between 0.5 g/m² and 3 g/m².

12. A direct thermal linerless label web obtainable by a method according to claim 1.

13. A direct thermal linerless label web comprising
a face, and
a water-based acrylic pressure sensitive adhesive coating on the face, wherein the face comprises:
a base layer,
a direct thermal printable coating, and
an intermediate layer disposed between the base layer and the direct thermal printable coating,
wherein
the intermediate layer has a grammage in a range between 0.9 g/m² and 7 g/m²,
the intermediate layer comprises
a binder, and
at least one pigment selected from a group consisting of a mineral pigment and a non-mineral pigment,
a total amount of the mineral pigments in the intermediate layer is between 0 and 4 g/m², and
a mineral pigment content of the intermediate layer is between 0 wt. % and less than 85 wt. %, calculated from total dry weight of the intermediate layer, and
a total mineral content of the direct thermal linerless label web is in a range between 0 and 20 wt. %, calculated from total dry weight of the direct thermal linerless label web.

14. The direct thermal linerless label web according to claim 13, wherein the base layer is an uncoated base paper having
a grammage in a range between 38 g/m² and 82 g/m², and/or
a mineral pigment content of equal to or less than 18 wt. %.

15. The direct thermal linerless label web according to claim 13, wherein the pressure sensitive adhesive coating comprises
an emulsified silicone additive, the amount of the emulsified silicone additive being in a range between 1 wt. % and 6 wt. %, calculated from the total dry weight of the adhesive coating.

16. The direct thermal linerless label web according to claim 13, wherein the intermediate layer has a grammage in a range between 1 g/m² and 5 g/m².

17. The direct thermal linerless label web according to claim 13, wherein the total amount of mineral pigments in the intermediate layer is equal to or less than 2 g/m².

18. The direct thermal linerless label web according to claim 13, wherein the mineral pigment content of the intermediate layer is equal to or less than 60 wt. %, calculated from total dry weight of the intermediate layer.

19. The direct thermal linerless label web according to claim 13, wherein a binder content of the intermediate layer is equal to or more than 20 wt. %, calculated from total dry weight of the intermediate layer.

20. The direct thermal linerless label web according to claim 13, wherein the adhesive coating has a coat weight in a range between 10 g/m² and 25 g/m², calculated as total dry weight of the adhesive coating.

21. The direct thermal linerless label web according to claim 13, wherein the pressure sensitive adhesive coating is on a second side of the face and a total coverage of the adhesive coating is in a range between 10% and 90%, calculated from the total area of the second side.

22. The direct thermal linerless label web according to claim 13, wherein the direct thermal printable coating has a grammage in a range between 1 g/m² and 5 g/m².

23. The direct thermal linerless label web according to claim 13, wherein the face further comprises a top coating on the direct thermal printable coating, wherein the top coating has a grammage in a range between 0.5 g/m² and 3 g/m².

24. A method of using a direct thermal linerless label web according to claim 13 in on-demand printing.

* * * * *